US012626924B2

(12) United States Patent
Yushin et al.

(10) Patent No.: US 12,626,924 B2
(45) Date of Patent: May 12, 2026

(54) BIOMASS-DERIVED CARBON

(71) Applicant: Sila Nanotechnologies, Inc., Alameda, CA (US)

(72) Inventors: Gleb Yushin, Atlanta, GA (US); Adam Kajdos, Alameda, CA (US)

(73) Assignee: Sila Nanotechnologies, Inc., Alameda, CA (US)

(*) Notice: Subject to any disclaimer, the term of this patent is extended or adjusted under 35 U.S.C. 154(b) by 0 days.

(21) Appl. No.: 18/740,192

(22) Filed: Jun. 11, 2024

(65) Prior Publication Data

US 2024/0332530 A1     Oct. 3, 2024

Related U.S. Application Data

(63) Continuation of application No. 18/314,703, filed on May 9, 2023, now Pat. No. 12,040,488, which is a
(Continued)

(51) Int. Cl.
| | |
|---|---|
| *H01M 4/00* | (2006.01) |
| *H01G 11/24* | (2013.01) |
| *H01G 11/34* | (2013.01) |
| *H01G 11/42* | (2013.01) |
| *H01G 11/44* | (2013.01) |
| *H01G 11/56* | (2013.01) |
| *H01G 11/86* | (2013.01) |
(Continued)

(52) U.S. Cl.
CPC ............ *H01M 4/587* (2013.01); *H01G 11/24* (2013.01); *H01G 11/34* (2013.01); *H01G 11/42* (2013.01); *H01G 11/44* (2013.01);

*H01G 11/56* (2013.01); *H01G 11/86* (2013.01); *H01M 10/052* (2013.01); *H01M 10/054* (2013.01); *H01M 2004/021* (2013.01)

(58) Field of Classification Search
CPC .... H01M 4/02; H01M 10/052; H01M 10/054; H01G 11/34; H01G 11/42; H01G 11/44; H01G 11/53
See application file for complete search history.

(56) References Cited

FOREIGN PATENT DOCUMENTS

| | | | | | |
|---|---|---|---|---|---|
| CA | 2250719 A1 | * | 4/1999 | ............ | H04M 4/625 |
| CN | 109704331 B | * | 5/2022 | | |
| JP | 2022500822 A | | 1/2022 | | |
| KR | 20170067878 A | * | 6/2017 | ............ | H04M 4/625 |
| KR | 20180113187 A | | 10/2018 | | |

OTHER PUBLICATIONS

Berdichevsky et al, Nanocomposite Battery Electrode Particles With Changing Properties, Jun. 2017, See The Abstract. (Year: 2017).*

(Continued)

*Primary Examiner* — Tiffany Legette
*Assistant Examiner* — Monique M Wills
(74) *Attorney, Agent, or Firm* — MUNCY, GEISSLER, OLDS & LOWE, P.C.; Daniel Podhajny

(57) ABSTRACT

An embodiment is directed to an electrode composition for use in an energy storage device cell. The electrode comprises composite particles, each comprising carbon that is biomass-derived and active material. The active material exhibits partial vapor pressure below around $10^{-13}$ torr at around 400 K, and an areal capacity loading of the electrode composition ranges from around 2 mAh/cm² to around 16 mAh/cm².

25 Claims, 10 Drawing Sheets

Related U.S. Application Data continuation of application No. 17/805,953, filed on Jun. 8, 2022, now Pat. No. 11,688,855, which is a continuation of application No. 16/570,972, filed on Sep. 13, 2019, now Pat. No. 11,380,896.

(60) Provisional application No. 62/731,771, filed on Sep. 14, 2018.

(51) Int. Cl.
| | | |
|---|---|---|
| *H01M 4/587* | (2010.01) | |
| *H01M 10/052* | (2010.01) | |
| *H01M 10/054* | (2010.01) | |
| *H01M 4/02* | (2006.01) | |

(56) References Cited

OTHER PUBLICATIONS

Inui et al., Carbon for a Lithium Secondary Battery, A Lithium Secondary Battery, and Manufacturing Methods Therefor, Apr. 1999, See The Abstract. (Year: 1999).*

Huang et al., A Preparation Method For Super Capacitor Active Carbon, May 2019, See the Abstract. (Year: 2019).*

Long et al., "Biomass-derived nanostructured carbons and their composites as anode materials for lithium ion batteries," Chem. Soc. Rev., 2017, 46, 7176-7190, Received Aug. 27, 2016, DOI: 10.1039/c6cs00639f.

* cited by examiner

INSERTION OF ACTIVE MATERIAL (SUCH AS LITHIUM OR SODIUM METAL) DURING CHARGING

EXTRACTION OF ACTIVE MATERIAL AND FORMING PORES DURING DISCHARGING

SEM MICROGRAPH OF A WOOD-DERIVED POROUS (ACTIVATED) CARBON

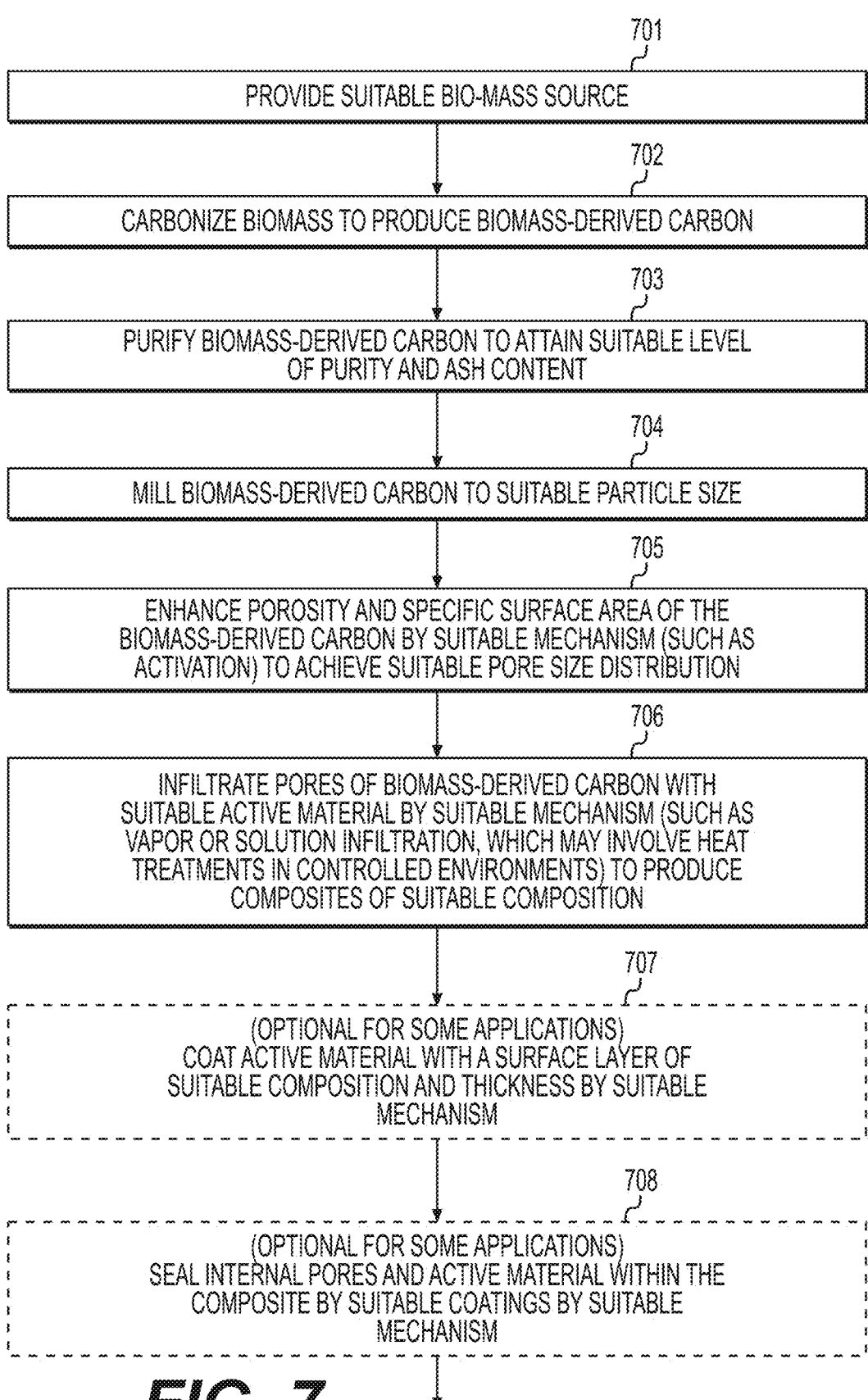

*701*

PROVIDE SUITABLE BIO-MASS SOURCE

*702*

CARBONIZE BIOMASS TO PRODUCE BIOMASS-DERIVED CARBON

*703*

PURIFY BIOMASS-DERIVED CARBON TO ATTAIN SUITABLE LEVEL OF PURITY AND ASH CONTENT

*704*

MILL BIOMASS-DERIVED CARBON TO SUITABLE PARTICLE SIZE

*705*

ENHANCE POROSITY AND SPECIFIC SURFACE AREA OF THE BIOMASS-DERIVED CARBON BY SUITABLE MECHANISM (SUCH AS ACTIVATION) TO ACHIEVE SUITABLE PORE SIZE DISTRIBUTION

*706*

INFILTRATE PORES OF BIOMASS-DERIVED CARBON WITH SUITABLE ACTIVE MATERIAL BY SUITABLE MECHANISM (SUCH AS VAPOR OR SOLUTION INFILTRATION, WHICH MAY INVOLVE HEAT TREATMENTS IN CONTROLLED ENVIRONMENTS) TO PRODUCE COMPOSITES OF SUITABLE COMPOSITION

*707*

(OPTIONAL FOR SOME APPLICATIONS) COAT ACTIVE MATERIAL WITH A SURFACE LAYER OF SUITABLE COMPOSITION AND THICKNESS BY SUITABLE MECHANISM

*708*

(OPTIONAL FOR SOME APPLICATIONS) SEAL INTERNAL PORES AND ACTIVE MATERIAL WITHIN THE COMPOSITE BY SUITABLE COATINGS BY SUITABLE MECHANISM

*FIG. 7*

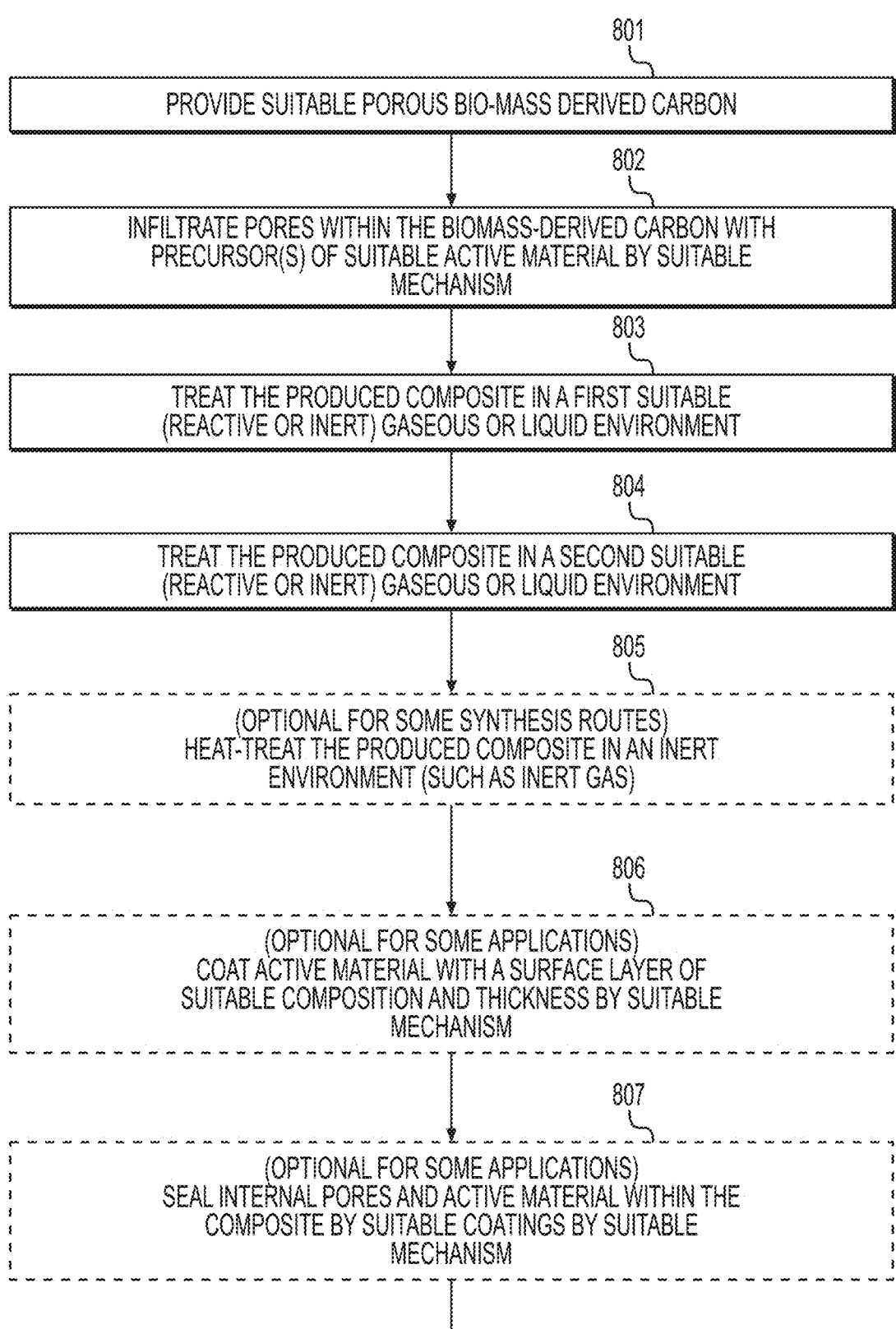

801
PROVIDE SUITABLE POROUS BIO-MASS DERIVED CARBON

802
INFILTRATE PORES WITHIN THE BIOMASS-DERIVED CARBON WITH PRECURSOR(S) OF SUITABLE ACTIVE MATERIAL BY SUITABLE MECHANISM

803
TREAT THE PRODUCED COMPOSITE IN A FIRST SUITABLE (REACTIVE OR INERT) GASEOUS OR LIQUID ENVIRONMENT

804
TREAT THE PRODUCED COMPOSITE IN A SECOND SUITABLE (REACTIVE OR INERT) GASEOUS OR LIQUID ENVIRONMENT 805
(OPTIONAL FOR SOME SYNTHESIS ROUTES) HEAT-TREAT THE PRODUCED COMPOSITE IN AN INERT ENVIRONMENT (SUCH AS INERT GAS)

806
(OPTIONAL FOR SOME APPLICATIONS) COAT ACTIVE MATERIAL WITH A SURFACE LAYER OF SUITABLE COMPOSITION AND THICKNESS BY SUITABLE MECHANISM 807
(OPTIONAL FOR SOME APPLICATIONS) SEAL INTERNAL PORES AND ACTIVE MATERIAL WITHIN THE COMPOSITE BY SUITABLE COATINGS BY SUITABLE MECHANISM

*FIG. 8*

BIOMASS-DERIVED CARBON

CROSS-REFERENCE TO RELATED APPLICATIONS

The present application for patent is a Continuation of U.S. patent application Ser. No. 18/314,703, entitled "BATTERY ELECTRODE COMPOSITION COMPRISING BIOMASS-DERIVED CARBON," filed May 9, 2023, which is a Continuation of U.S. patent application Ser. No. 17/805,953, entitled "BATTERY ELECTRODE COMPOSITION COMPRISING BIOMASS-DERIVED CARBON," filed Jun. 8, 2022, which is a Continuation of U.S. patent application Ser. No. 16/570,972, entitled "BATTERY ELECTRODE COMPOSITION COMPRISING BIOMASS-DERIVED CARBON," filed Sep. 13, 2019, which claims the benefit of U.S. Provisional Application No. 62/731,771, entitled "SUPERCAPACITOR AND BATTERY ELECTRODES COMPRISING BIOLOGICALLY DERIVABLE CARBON," filed Sep. 14, 2018, each of which is expressly incorporated herein by reference in its entirety.

BACKGROUND

Field

The present disclosure relates generally to energy storage devices, and more particularly to battery technology, supercapacitor technology and the like.

Background

Owing in part to their relatively high energy densities, relatively high specific energy, relatively high specific power, relatively fast charging, light weight, and potential for long lifetimes and cycle life, advanced rechargeable batteries and supercapacitors are desirable for a wide range of electronic devices, electric vehicles, grid storage and other important applications.

However, despite the increasing commercial prevalence of electrochemical energy storage technologies, further development of the batteries and supercapacitors is needed, particularly for potential applications in low- or zero-emission, hybrid-electrical or fully-electrical vehicles, consumer electronics, energy-efficient cargo ships and locomotives, aerospace applications, and power grids. In particular, further improvements are desired for various rechargeable batteries, such as rechargeable metal and metal-ion batteries (such as rechargeable Li and Li-ion batteries, rechargeable Na and Na-ion batteries, rechargeable Mg and Mg-ion batteries, rechargeable K and K-ion batteries, rechargeable Ca and Ca-ion batteries, etc.). The following energy storage devices may similarly benefit from the additional improvements: rechargeable halogen-ion batteries (such as F-ion and Cl-ion batteries, etc.), rechargeable mixed ion batteries, rechargeable aqueous batteries (e.g., rechargeable batteries with pH-neutral or acidic or caustic electrolytes), electrochemical capacitors (e.g., supercapacitors or double layer capacitors), hybrid devices, rechargeable polymer electrolyte batteries and supercapacitors, rechargeable polymer gel electrolyte batteries and supercapacitors, rechargeable solid ceramic or solid glass electrolyte batteries, rechargeable composite electrolyte batteries, to name a few.

A broad range of active (charge-storing) materials, a broad range of polymer binders, a broad range of conductive additives and various mixing recipes may be utilized in the construction of battery electrodes. In some designs, active materials may be utilized in the form of composite particles. However, for improved electrode performance (low and stable resistance, high cycling stability, high rate capability, acceptable energy, good volumetric capacity, etc.), the optimal composite formulations need to be identified. Furthermore, the choice of binders, additives, and mixing protocols needs to be discovered for specific types, specific physical and chemical properties and specific sizes of active particles. In many cases, the choices of the composite particle architecture and compositions as well as the composition of the electrodes are not trivial and can be counter-intuitive.

In many different types of rechargeable batteries and supercapacitors, charge storing materials may be produced as (nano) composite powders, which may comprise conductive carbon. As a subset of such particles, conductive carbon may be biologically derived. In principle, such a class of charge-storing (nano) composite particles may offer great promises for scalable (and, in some case, sustainable) manufacturing and achieving good charge storage performance characteristics. Unfortunately, it largely remains unclear what types and what properties of biologically derived carbon would be advantageous in such applications of composite ((nano) composite) particles. In addition, it is further unclear how to achieve effective processing of such (nano) composite particles into electrodes that would result in good performance characteristics, including high capacity, fast charging, fast discharging and long cycle stability. The performance of battery electrodes comprised of similar (nano) composites may become particularly poor when the electrode capacity loading becomes moderate (for batteries) (2-4 mAh/cm$^2$) or even more so when it becomes high (e.g., 4-16 mAh/cm$^2$). Higher capacity loading, however, is advantageous for increasing battery cell energy density and reducing cell manufacturing costs. The performance of supercapacitor electrodes comprised of similar (nano) composites may become particularly poor when the electrode capacity loading exceeds about 0.1 mAh/cm$^2$. Higher capacity loading, however, is advantageous for increasing supercapacitor energy density and reducing its manufacturing costs.

Accordingly, there remains a need for improved batteries, components, electrode materials and other related materials and manufacturing processes.

SUMMARY

An embodiment is directed to an electrode composition for use in an energy storage device cell. The electrode comprises composite particles, each comprising carbon that is biomass-derived and active material. The active material exhibits partial vapor pressure below around $10^{-13}$ torr at around 400 K, and an areal capacity loading of the electrode composition ranges from around 2 mAh/cm$^2$ to around 16 mAh/cm$^2$.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIG. 7 illustrates an example process that may be utilized for the formation of suitable composites comprising active material and biomass-derived carbon according to various example embodiments.

FIG. 8 illustrates an example method that may be utilized for the formation of suitable composites comprising active material and biomass-derived carbon according to various example embodiments.

DETAILED DESCRIPTION

Figure 1:
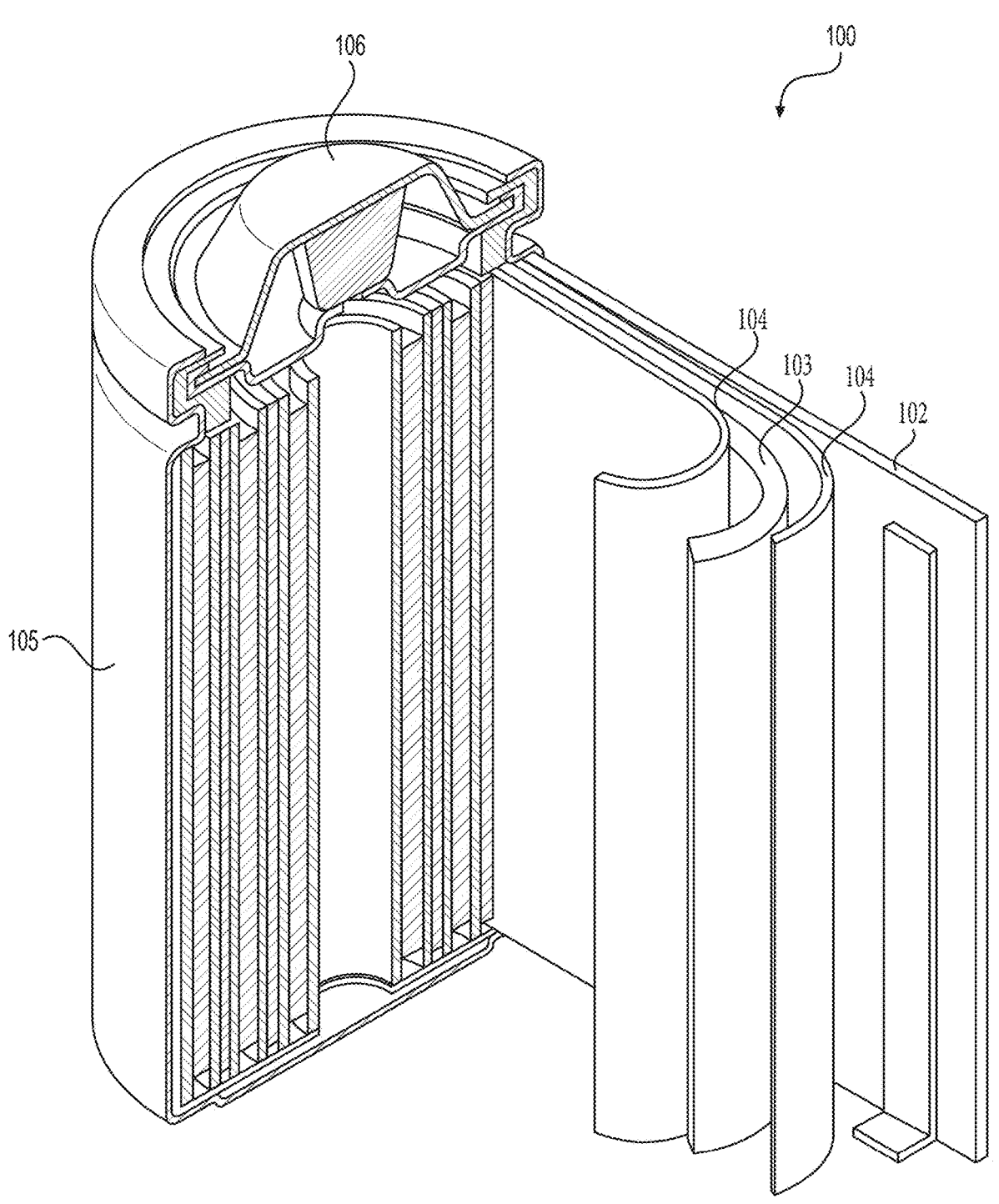
FIG. 1 illustrates an example (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details. Further, the terminology of "at least partially" is intended for interpretation as "partially, substantially or completely".

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of

[7, 8, 9, 10, . . . , 19, 20], as if the intervening numbers 8 through 19 in units or increments of ones were expressly disclosed. In another example, a temperature range from about −120° C. to about −60° C. encompasses (in ° C.) a set of temperature ranges from about −120° C. to about −119° C., from about −119° C. to about −118° C., . . . from about −61° C. to about −60° C., as if the intervening numbers (in ° C.) between −120° C. and −60° C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the description below may describe certain examples in the context of Li metal and Li-ion batteries (for brevity and convenience, and because of the current popularity of Li technology), it will be appreciated that various aspects may be applicable to other rechargeable and primary batteries (such as Na metal and Na-ion, Mg metal and Mg-ion, K metal and K-ion, Ca metal and Ca-ion and other metal and metal-ion batteries, alkaline batteries with OH-ions, mixed ion batteries, etc.) as well as electrochemical capacitors (often referred to as supercapacitors or pseudo-capacitors) or hybrid devices (e.g., with one electrode being battery-like and another electrode being electrochemical capacitor-like).

While the description below may describe certain examples in the context of active ions being contained within active particles, it will be appreciated that various aspects may be applicable to active ions residing in the electrolyte at some stage of the cell assembling or charge or discharge.

Further, while the description below may also describe certain examples of the active material formulations in a Li-containing state, it will be appreciated that various aspects may be applicable to Li-free electrodes.

Further, while the description below may also describe certain examples of the active electrode material belonging to so-called intercalation-type active material(s), it will be appreciated that various aspects may be applicable to so-called conversion-type active material(s) (including so-called alloying type active materials, true conversion-type active materials, chemical transformation-type active materials, metal active material, etc.), so-called pseudocapacitive active materials, so-called double-layer capacitor-type active materials as well as mixed type active materials (or components of active materials) that may store charge by more than one mechanism (e.g., active materials that exhibit both intercalation and conversion-type electrochemical reactions during cell operation or active materials that exhibit both intercalation and pseudocapacitance or active materials that exhibit both intercalation and double layer capacitors, among many other combinations).

Further, while the description below may also describe certain examples of active (reversibly ion-storing) materials (as component(s) of the (nano) composites) in the form of crystalline (or nanocrystalline) materials, it will be appreciated that various aspects may be applicable to highly disordered or amorphous active materials.

Further, while the description below may also describe certain examples of biomass-derived carbon materials, it will be appreciated that various aspects may be applicable to other types of carbon materials, including those produced from both organic and inorganic precursors and those that utilize (e.g., sacrificial) templates for the formation of some of the pores.

Further, while the description below may also describe certain examples of liquid organic electrolytes as components of electrochemical cells (batteries or electrochemical capacitors) based on the (nano) composite electrodes, it will be appreciated that various aspects may be applicable to aqueous electrolytes, ionic salt electrolytes, molten salt electrolytes, solid ceramic electrolytes, solid glass electrolyte, solid polymer electrolytes (including single-ion conducting solid polymer electrolytes, where one ion (e.g., cation) is mobile, while the counter ion (e.g., anion) is chemically attached to the polymer backbone), gel electrolytes, composite (e.g., glass-ceramic or glass-polymer or ceramic-polymer or liquid-ceramic or liquid-polymer or liquid-ceramic-polymer or liquid-glass-polymer or liquid-glass-ceramic-polymer) electrolytes, and others. In some designs, more than one electrolyte could be used in a single cell construction (e.g., one electrolyte infiltrated/coating the surface of the electrode or active material and another electrolyte interpenetrating remaining pores in the electrode (s) or comprising at least a part of the separator membrane; or, as another illustrative example, one electrolyte contacting the anode and another electrolyte contacting the cathode).

In some examples and designs, the solid (at device operating temperatures) electrolytes may be melt-infiltrated into at least some of the pores within electrodes or active materials at elevated temperatures (at temperatures, where the electrolyte becomes liquid). In some examples and designs, the solid (at device operating temperatures) electrolytes may be dissolved into a solvent, infiltrated into the pores of the electrodes (or active materials), followed by solvent evaporation (drying). The remaining pores could be filled by another electrolyte in a fully assembled device (such as a Li-ion battery cell).

In some examples and designs, the polymer electrolytes may be infiltrate at least some of the pores within electrodes or active materials in a liquid state and polymerize after the infiltration (e.g., during heating or after sufficient storage in a suitable temperature range). In some designs, such polymerization may take place prior to cell use (application). In some designs, such polymerization may take place after the cell assembling. In some designs, such polymerization may take place after the cell sealing.

During battery (such as a Li-ion battery) operation, intercalation-type active materials operate by insertion (intercalation) and extraction (de-intercalation) of Li ions into/from the interstitial positions (nanoscale or sub-nanoscale voids) present in crystalline or disordered or fully amorphous structure of such intercalation compounds. This intercalation/de-intercalation process is accompanied by the changes in the oxidation state of the non-Li atoms (ions) (e.g., such as transition metal ions). Chemical bonds typically do not break or reform during such processes. Li ions diffuse in/out of the active materials.

During battery (such as a Li-ion battery) operation, conversion materials change (convert) from one crystal structure to another (hence the name "conversion"-type). During (e.g., Li-ion) battery operation, Li ions are inserted into alloying type materials forming lithium alloys (hence the name "alloying"-type). Sometimes, "alloying"-type electrode materials (commonly metals and semimetals) are considered to be a sub-class of "conversion"-type electrode materials. "Alloying"-type electrode materials may also comprise other type(s) of conversion materials (such as oxides, hydrides, nitrides, etc.) as minor (e.g., about 0.1%-50 wt. %) additions as well as less active materials (which may exhibit significantly lower, e.g., about 0.01%-30% of the alloying material gravimetric capacity) that may help to enhance mechanical or electrochemical stability of the alloying materials or enhance their electrical conductivity in a delithiated state (these may be intercalation-type materials). The electrochemical reaction processes between Li ions and alloying or conversion materials may be accompanied by the breakage of some of the original chemical bonds and the formation of new chemical bonds. In an ideal case for some designs, the process is somewhat reversible and only little (or no) loss of active material (or Li) takes place during the battery operation (e.g., preferably no more than about 30% during the lifetime of a battery).

While the description below may describe certain examples in the context of metal-ion batteries, other conversion-type electrodes that may benefit from various aspects of the present disclosure include various chemistries used in a broad range of aqueous batteries, such as alkaline batteries, metal hydride batteries, lead acid batteries, etc. These include, but are not limited to, various metals (such as iron, zinc, cadmium, lead, indium, etc.), metal oxides, metal hydroxides, metal oxyhydroxides, and metal hydrides, to name a few.

While the description below may describe certain examples in the context of metal fluoride electrodes for metal-ion (e.g., Li-ion) or metal (e.g., Li) batteries, other conversion-type electrodes (including those that comprise fluorine) may benefit from various aspects of the present disclosure. Examples of such conversion-type active electrode materials may include, but are not limited to, various metal oxy-fluorides, sulfo-fluorides, chloro-fluorides, oxy-chloro-fluorides, oxy-sulfo-fluorides, fluoro-phosphates, sulfo-phosphates, sulfo-fluoro-phosphates, mixtures of metals (e.g., Fe, Cu, Cu—Fe mixtures, other alloys, partially oxidized metals and metal alloys, etc.) and salts (metal fluorides (including LiF), metal chlorides (including LiCl), metal oxy-fluorides, metal oxides, metal sulfo-fluorides, metal fluoro-phosphates, metal sulfides, metal oxy-sulfo-fluorides, their various combinations, etc.), and other salts that comprise halogen or sulfur or oxygen or phosphorous or a combination of these elements, among others.

FIG. 1 illustrates an example metal or metal-ion (e.g., Li or Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104 (and typically impregnating both anode 102 and cathode 103), a battery case 105, and a sealing member 106 sealing the battery case 105. In some designs in case of solid electrolyte(s), a solid electrolyte membrane may serve as a separator 104.

Both liquid and solid electrolytes may be used for the designs herein. Conventional electrolytes for Li- or Na-based batteries of this type are generally composed of a single Li or Na salt (such as $LiPF_6$ for Li-ion batteries and $NaPF_6$ or $NaClO_4$ salts for Na-ion batteries) in a mixture of organic solvents (such as a mixture of carbonates). Other common organic solvents that may be suitable in the context of one or more embodiments of the present disclosure include nitriles, esters, sulfones, sulfoxides, phosphorous-based solvents, silicon-based solvents, ethers, and others. Such solvents may be modified (e.g., be sulfonated or fluorinated). The electrolytes may also comprise ionic liquids (in some designs, neutral ionic liquids; in other designs, acidic or basic ionic liquids). The electrolytes may also comprise mixtures of various salts (e.g., mixtures of several Li salts or mixtures of Li and non-Li salts for rechargeable Li and Li-ion batteries).

In the case of aqueous Li-ion (or aqueous Na-ion, K-ion, Ca-ion, etc.) batteries, suitable electrolytes may include a solution (e.g., aqueous solution or mixed aqueous-organic solution) of inorganic Li (or Na, K, Ca, etc.) salt(s) (such as $Li_2SO_4$, $LiNO_3$, $LiCl$, $LiBr$, $Li_3PO_4$, $H_2LiO_4P$, $C_2F_3LiO_2$, $C_2F_3LiO_3S$, $Na_2O_3Se$, $Na_2SO_4$, $Na_2O_7Si_3$, $Na_3O_9P_3$, $C_2F_3NaO_2$, etc.). These electrolytes may also comprise solutions of organic Li (or Na, K, Ca, etc.) salts, such as (listed with respect to Li for brevity) metal salts of carboxylic acids (such as $HCOOLi$, $CH_3COOLi$, $CH_3CH_2COOLi$, $CH_3(CH_2)_2COOLi$, $CH_3(CH_2)_3COOLi$, $CH_3(CH_2)_4COOLi$, $CH_3(CH_2)_5COOLi$, $CH_3(CH_2)_6COOLi$, $CH_3(CH_2)_7COOLi$, $CH_3(CH_2)_8COOLi$, $CH_3(CH_2)_9COOLi$, $CH_3(CH_2)_{10}COOLi$, $CH_3(CH_2)_{11}COOLi$, $CH_3(CH_2)_{12}COOLi$, $CH_3(CH_2)_{13}COOLi$, $CH_3(CH_2)_{14}COOLi$, $CH_3(CH_2)_{15}COOLi$, $CH_3(CH_2)_{16}COOLi$, $CH_3(CH_2)_{17}COOLi$, $CH_3(CH_2)_{18}COOLi$ and others with the formula $CH_3(CH_2)xCOOLi$, where x ranges up to 50); metal salts of sulfonic acids (e.g., $RS(=O)_2$—$OH$, where R is a metal salt of an organic radical, such as a $CH_3SO_3Li$, $CH_3CH_2SO_3Li$, $C_6H_5SO_3Li$, $CH_3C_6H_4SO_3Li$, $CF_3SO_3Li$, $[CH_2CH(C_6H_4)SO_3Li]_n$ and others) and various other organometalic reagents (such as various organilithium reagents), to name a few. Such solutions may also comprise mixtures of inorganic and organic salts, various other salt mixtures (for example, a mixture of a Li salt and a salt of non-Li metals and semimetals) and, in some cases, hydroxide(s) (such as $LiOH$, $NaOH$, $KOH$, $Ca(OH)_2$, etc.), and, in some cases, acids (including organic acids). In some designs, such aqueous electrolytes may also comprise neutral or acidic or basic ionic liquids (from approximately 0.00001 wt. % to approximately 40 wt. % relative to the total weight of electrolyte). In some designs, such "aqueous" (or water containing) electrolytes may also comprise organic solvents (from approximately 0.00001 wt. % to approximately 40 wt. % relative to the total weight of electrolyte), in addition to water. Illustrative examples of suitable organic solvents may include carbonates (e.g., propylene carbonate, ethylene carbonate, diethyl carbonate, dimethyl carbonate, ethyl methyl carbonate, fluoriethylene carbonate, vinylene carbonate, and others), various nitriles (e.g., acetonitrile, etc.), various esters, various sulfones (e.g., propane sulfone, etc.), various sultones, various sulfoxides, various phosphorous-based solvents, various silicon-based solvents, various ethers, and others.

The most common salt used in certain conventional Li-ion battery electrolyte, for example, is $LiPF_6$, while less common salts that may also be suitable in the context of one or more embodiments of the present disclosure include lithium tetrafluoroborate ($LiBF_4$), lithium perchlorate ($LiClO_4$), lithium bis(oxalato)borate ($LiB(C_2O_4)_2$, lithium difluoro (oxalate)borate ($LiBF_2(C_2O_4)$), various lithium imides (such as $SO_2FN(Li^+)SO_2F$, $CF_3SO_2N(Li^+)SO_2CF_3$, $CF_3CF_2SO_2N(Li^+)SO_2CF_3$, $CF_3CF_2SO_2N(Li^+)SO_2CF_2CF_3$, $CF_3SO_2N(Li^+)SO_2CF_2OCF_3$, $CF_3OCF_2SO_2N(Li^+)SO_2CF_2OCF_3$, $C_6F_5SO_2N(Li^+)SO_2CF_3$, $C_6F_5SO_2N(Li^+)SO_2C_6F_5$ or $CF_3SO_2N(Li^+)SO_2PhCF_3$, and others), and others. Electrolytes for Mg-ion, K-ion, Ca-ion, and Al-ion batteries may be more exotic as these batteries are in earlier stages of development. These exotic electrolytes may comprise different salts and solvents (in some cases, ionic liquids may replace organic solvents for certain applications). In some designs, more than one Li salts may advantageously be used in electrolytes. In some designs, electrolytes for Li-ion batteries may also advantageously comprise non-Li salts.

Some electrolytes in some aqueous batteries (such as alkaline batteries, including nickel-metal hydride batteries, among others) may comprise an alkaline solution (for example, a mixture of KOH and LiOH solutions). Some electrolytes in aqueous batteries (such as lead acid batteries) may comprise an acidic aqueous solution (for example, $H_2SO_4$ aqueous solution or HCl aqueous solution). Some electrolytes in aqueous batteries may comprise an organic solvent as an additive. Some electrolytes in aqueous batteries may comprise two or more organic solvent(s) or ionic liquid(s) or surfactant(s) as additive(s) or substantial components of the electrolyte.

Conventional electrodes utilized in Li or Li-ion batteries may be produced by (i) formation of a slurry comprising active materials, conductive additives, binder solutions and, in some cases, surfactant or other functional additives; (ii) casting the slurry onto a metal foil (e.g., Cu foil for most anodes used in Li or Li-ion batteries and Al foil for most cathodes used in Li or Li-ion batteries as well as for high potential anodes used in Li-ion batteries, such as lithium titanate); (iii) drying the casted slurry to completely evaporate the solvent; and (iv) optionally densifying the electrodes (e.g., by pressure calendaring). Instead of using such a solvent-based process for electrode fabrication, in some designs it may be advantageous to use dry electrode processing (without using solvents), including, but not limited to, electrostatic coating.

Conventional cathode materials utilized in Li and Li-ion batteries may be of an intercalation-type. Metal ions are intercalated into and occupy the interstitial positions of such materials during the charge or discharge of a battery. Such cathodes experience very small volume changes when used in electrodes. Such cathodes also typically exhibit high density (e.g., about 3.8-6 $g/cm^3$) and are relatively easy to mix in slurries. Polyvinylidene fluoride, or polyvinylidene difluoride (PVDF), is one of the most common binders used in these electrodes. Carbon black is the most common conductive additive used in these electrodes. However, such cathodes exhibit relatively small gravimetric and volumetric capacities (e.g., less than 220 mAh/g and less than 1000 $mAh/cm^3$, respectively).

In many applications and electrode designs, batteries with intercalation-type cathode and anode materials may exhibit fast charge and discharge rates (e.g., charging to about 80% of the maximum capacity within about 10-60 minutes). However, in some applications (e.g., for even faster rate performance (e.g., charging to about 80% of the maximum capacity within about 1-600 seconds) or for better stability or for better performance at low or at high temperatures), it may be advantageous to produce composites comprising such intercalation-type active materials and use them in the electrodes for batteries or hybrid devices. In some designs, instead of or in addition to pure intercalation-type active materials, so-called pseudocapacitive materials may be utilized. Electrodes may comprise 100% of such composites or alternatively may comprise a mixture of composites and "regular" active materials. The suitable mass fraction of the composite particles in such "mixed" electrodes may range from about 1 to about 99 wt. % of all the active material particles in a given electrode (that is not counting the weight of the binder, conductive and other additives as well as the weight of the current collectors), depending on the requirements and demands of an application. In some designs, smaller than about 1 wt. % fraction may be too small to make a substantial difference. Similarly, in some designs, larger than about 99 wt. % fraction, on the other hand, may lead to undesirable increase in the electrode mixing complexity and cost and may be better replaced with about 100 wt. % of composite(s) without any substantial sacrifice with the electrode properties. However, any fraction (from about 0 to about 100 wt. %) may be suitable for some applications. In some designs, it may further be advantageous for such composites to comprise carbon due to carbon's high electrical conductivity, acceptable mobility for Li and other ions and good chemical and electrochemical resistance. In some designs, it may be advantageous for such carbon to comprise mostly (e.g., about 90-100%) $sp^2$-bonded carbon atoms (e.g., in order to attain high electrical conductivity or for other performance benefits). In some designs, it may be advantageous (e.g., for faster rate performance) for the carbon to be sufficiently electrically conductive (e.g., with electrical conductivity in the range from about 1 S/m to about $10^6$ S/m). In some designs, it may be advantageous (for performance, morphology, scalability and cost reasons, among others) for the carbon to be derived from biomass (including natural and renewable biomass).

It should be noted that biomass-derived carbon may typically be easily distinguished from carbon derived from synthetic resins or inorganic carbon sources or other sources of carbon by observing their morphology at the sub-micron scale by, for example, scanning electron microscopy (SEM) and other techniques. Furthermore, carbons from different biomass sources may also be distinguished because biomass sources typically exhibit structural features that are reflected in the final carbon product (for example, after carbonization, purification, porosity enhancement, etc.).

In some designs, the rate performance characteristics and cycle stability (for fast rate cycling) of such carbon comprising composite electrodes may become particularly unsatisfactory for applications requiring ultra-fast charging (e.g., within 1-600 seconds) if the electrode areal capacity loading exceeds about 0.1-0.2 mAh/cm², and even more so when if the electrode areal capacity exceeds about 1-2 mAh/cm², and further more if the electrode areal capacity exceeds about 4 mAh/cm². Higher loading, however, is advantageous for reducing cost of energy storage devices and increasing their energy density. One or more embodiments of the present disclosure are directed to synthesis processes, compositions and various physical and chemical properties of biomass-derived carbon comprising composite electrodes that enable satisfactory performance for electrode area loadings exceeding 0.1-0.2 mAh/cm² and even for loadings in the range from around 1-2 mAh/cm² to around 4 and even for loading exceeding 4 mAh/cm² (e.g., in some designs, an areal capacity loading of an electrode composition may range from around 2 mAh/cm² to around 16 mAh/cm²).

In some designs, it may be advantageous for the composites comprising such intercalation-type (or pseudocapacitive-type) active materials and biomass-derived carbon to have a meaningful weight fraction of active materials, such as preferably from around 20 wt. % to around 98 wt. % (in some designs, from around 40 wt. % to around 85 wt. %). In some designs, the weight ratio of active intercalation-type (or pseudocapacitive-type) material to biomass-derived carbon may preferably range from around 1:4 to around 50:1 (in some designs, from around 1:3 to around 9:1). Too low fraction of intercalation-type (or pseudocapacitive-type) active materials may lead to undesirably low volumetric capacity (or capacitance in case of supercapacitors), while too high fraction of intercalation-type (or pseudocapacitive-type) active materials may lead to reduced rate and stability.

In some designs (e.g., for faster charging rate) it may be advantageous for such biomass-derived carbon comprising composites with intercalation-type (or pseudocapacitive-type) materials to comprise pores. In some designs, it may be advantageous for the pore volume in the composite to range from around 0.01 cm³/g to around 1.5 cm³/g (in some designs, from around 2 vol. % to around 75 vol. %). In some designs, it may be advantageous for at least some portion (e.g., about 10-100 vol. %, e.g., about 20-100 vol. %; in some designs from around 50 vol. % to around 100 vol. %) of the pores to remain interconnected and be accessible to electrolyte while the electrode composition is made part of an energy storage device cell. In some designs, it may be advantageous for at least some portion (e.g., about 1-100 vol. %) of the pores to be interconnected to neighboring pores and accessible from the center of the composite particles. In some designs, it may be advantageous for at least some portion (e.g., about 1-100 vol. %) of the pores to exhibit characteristic dimensions (e.g., diameter or width) in the range from about 0.3 nm to around 600 nm. In some designs, it may be advantageous (e.g., to maximize volumetric capacity of the electrodes, while attaining high rate performance) for at least some fraction (e.g., about 0.1-30 vol. %) of the pores to exhibit characteristic dimensions in the range from about 5 nm to about 50 nm. In some designs, it may be advantageous (e.g., to maximize volumetric capacity of the electrodes or to improve stability) for at least some fraction (e.g., about 30-100 vol. %) of the pores to exhibit characteristic dimensions in the range from about 0.3 nm to about 10 nm. In some designs, it may be advantageous (e.g., to maximize volumetric capacity of the electrodes or to improve stability) for at least some fraction (e.g., about 30-100 vol. %) of the pores to exhibit characteristic dimensions in the range from 0.3 nm to 5 nm. In some designs (e.g., to maximize volumetric capacity of the electrodes and volumetric energy storage characteristics), it may be advantageous for the volume fraction of the pores in such composites to be small (e.g., about 0.001-5 vol. %) or moderate (e.g., about 5-20 vol. %). In some designs (e.g., to maximize energy storage characteristics, such as power or energy density or cycle stability or achieve a compromise between these or other characteristics), it may be advantageous for the so-called Brunauer-Emmett-Teller (BET) specific surface area (SSA) or density functional theory (DFT) SSA of the composite electrode materials (e.g., as measured using $N_2$ or Ar or $CO_2$ or $H_2$ sorption technique and analyzed using BET or DFT methods) to range from about 0.5 m²/g to about 2000 m²/g (in some designs, from around 10 m²/g to around 1000 m²/g, in some designs, from around 10 m²/g to around 2000 m²/g). Larger SSA may allow faster charge or discharge rate performance, but may also lead to higher fraction (rate) of some undesirable side reactions (e.g., with electrolyte). The rate of such undesirable (e.g., leading to self-discharge or to gassing or to formation of deposits or to the irreversible consumption of electrolyte or to electrode or cell swelling, etc.) reactions may depend on the operating electrode potential and electrolyte composition. The acceptable rates depend on the particular application. However, for many electrolyte systems and for most cell designs and applications, it may generally be preferable for the BET SSA to range from about 5 $m^2$/g to about 1000 $m^2$/g. In some designs, it may be preferable for the BET SSA to range from about 10 $m^2$/g to about 200 $m^2$/g. In some designs (particularly for higher BET SSE composites), it may be advantageous for the active (e.g., intercalation-type) materials to be protected (from undesirable interactions with electrolyte) by a protective surface (shell) layer. In some designs, the suitable thickness of the protective surface layer may range from about 0.3 nm to about 60 nm. Smaller thickness may be less effective for some applications, while larger thickness may lead to reduced rate performance of reduced volumetric and gravimetric energy densities for some applications. In some designs, the protective surface layer may directly coat at least a portion (e.g., about 1-100% of the outer surface area) of the active material(s)/particle(s) that otherwise would be exposed to electrolyte during at least some time of the battery assembling or operation. In some examples, the protective surface layer may comprise carbon. In some examples, the protective surface layer may comprise an oxide, a fluoride, an oxyfluoride, a sulfide, a nitride, an oxynitride, a nitride fluoride, a phosphate, a fluorophosphate (phosphate fluoride), or another material that comprises atoms of metals or semimetals. In some designs, the protective surface layer material may comprise one or more of the following elements: transition, alkali or alkaline-earth metal (such as iron (Fe), manganese (Mn), copper (Cu), yitrium (Y), zirconium (Zr), niobium (Nb), molybdenum (Mo), chromium (Cr), lithium (Li), sodium (Na), magnesium (Mg), potassium (K), calcium (Ca), strontium (Sr), cesium (Cs), barium (Ba), among others), lanthanum or lanthanoids (La, Ce, Gd, Nd, Eu, etc.), beryllium (Be), aluminum (Al), silicon (Si), gallium (Ga), germanium (Ge), phosphorous (P), arsenic (As), tin (Sn), bismuth (Bi), lead (Pb), indium (In), cadmium (Cd), zinc (Zn), fluorine (F), iodine (I), oxygen (O), nitrogen (N), sulfur(S), selenium (Se), tellurium (Te), hydrogen (H) and carbon (C).

In some designs (e.g., to maximize electrode uniformity and battery stability), it may be advantageous for such biomass-derived carbon comprising composite electrode particles to exhibit average characteristics dimensions (e.g., diameter) in the range from around 5 nanometers (nm) to around 150 microns. Too small of a particle size may lead to difficulties achieving high packing density for some applications. At the same time, smaller participates may also result in small interparticle pore size, which may slow down rate performance in the electrode and lead to faster cell degradation in some designs (particularly, if batteries are operating at faster rates or at lower temperatures). Too large of an average particle size, on the other hand, may lead to local variations in the electrode capacity loading and result in faster cell degradation in some designs (particularly if the battery is operating at lower temperatures or at faster rates). The composite particle size, the interconnectivity of the pores in the composite as well as the ionic and electronic transport within the composite materials may affect the particle-level rate performance. In some designs, too large of an average particle size may also result in poor (or insufficiently good for a given application) charge or discharge rate performance. While various electrode and electrolyte properties, battery cell operational conditions (e.g., current, rate, temperature, charge voltage, electrode operating potential, etc.), porosity and shape of the composite particles and other parameters affect optimal composite particle size, it is advantageous in some designs for such composite electrode particles to exhibit average characteristics dimensions in the range from around 300 nm to around 20-30 microns (in some designs—from around 0.5 micron to around 10 microns). Suitable electrode-level porosity (mostly—the volume fraction of the space in the electrode filled by the electrolyte) may be affected by the volume fraction of the binder, volume fraction of conductive and other additive and volume fraction of active (composite) particles (and their open porosity), electrolyte conductivity, electrode thickness, battery operation and other properties. However, values ranging from around 1 vol. % to around 75 vol. % are acceptable for some applications. Smaller volume fraction may lead to slow charging or discharging rates and faster cell degradation in some applications. Larger fraction may undesirably reduce volumetric energy density, rate performance and increase battery costs in some applications. In some designs, the volume fraction of the electrode occupied (filled) with a suitable electrolyte may advantageously range from around 1 vol. % to around 75 vol. %. In some designs, the suitable volume fraction of the electrode occupied (filled) with a suitable electrolyte may even be in narrower range, from around 5 vol. % to around 60 vol. % (or even in a more narrow range, for example, from around 10 vol. % to around 40 vol. %).

In some designs, the average size of intercalation-type particles or pseudocapacitive-type particles (within the biomass-derived carbon comprising composite electrode particles) to range from around 0.5 nm to around 200 nm (in some designs, preferably, from around 1 nm to around 60 nm; in some designs—from around 2 nm to around 20 nm). Too large size may not provide sufficiently fast electrochemical reactions in some designs, while too small size may lead to undesirable side-reactions or too small mass loadings of intercalation-type or pseudocapacitive-type particles within such composites, thus limiting energy characteristics of the energy storage devices built with these composite particles in some designs.

In some designs, the intercalation-type particles or pseudocapacitive-type particles (of the composite electrode particles) may preferably be located inside (e.g., confined by) the pores of the biomass-derived carbon particles. In some designs, it may be preferable for at least a meaningful portion of such pores (e.g., about 20 to about 100%) to remain open. In some designs, about 50 to about 100 wt. % of the active material in the composite particles may be confined within pores defined in the biomass-derived carbon particles.

In some designs, it may be advantageous to produce two types of pores (to be filled with electrolyte for the cell assembling and battery operation) in the carbon comprising composite electrodes: (i) "regular" type pores between the particles (as in "regular" battery or supercapacitor electrodes) or within porous composite particles; (ii) additional "channel" pores that are larger than "regular" pores (on average) and propagate from the surface of the electrode towards the current collector surface. Such "channel" pores may significantly enhance the electrolyte penetration from the electrode surface and assist in enhancing battery cell-level rate performance in some applications. In some designs, it may be advantageous for these "channel" pores to be straight (e.g., to minimize tortuosity for ion motion from the surface to the bulk and the bottom of the electrode). It may be further advantageous in some designs for these "channel" pores to propagate to more than about 25% of the electrode thickness (in some designs-more than about 50% of the electrode thickness, including all the way through the electrode reaching current collector; e.g., to enhance ion transport more meaningfully). In some designs, it may be advantageous for these "channel" pores to be regularly spaced (e.g., in a hexagonal or square or orthorhombic or rectangular patterns) (e.g., to achieve the smallest maximum distance from all the particles in the electrode to the surface of the "channel" pores per given number of the channel pores within a unit area of the electrode). Note that "regular" electrodes made with "regular" intercalation active materials in some designs do not have such "channel" pores. This is, in part, because "regular" electrodes in some designs do not require ultra-fast charging (e.g., about 1-600 sec). In contrast, in some designs the carbon comprising composite electrode particles may charge and discharge (insert and extract ions) substantially faster and thus it becomes important that the cell rate performance not to be limited by the electrode-level ion transport kinetics. That is why, as an example, the presence of such "channel" pores may become advantageous in the described carbon comprising composites. This may become particularly important for medium thickness (e.g., about 25-75 micron/one coating side) and even more so for large thickness (e.g., about 75-2,000 micron/one coating side) of the composite-comprising electrodes. Furthermore, many intercalation-type (or pseudocapacitive-type) electrode materials exhibit small but meaningful volume changes (e.g., between about 0.1-12 vol. %) during charge and discharge and thus may induce stresses within electrodes during the battery operation in some designs. During a relatively slow operation of "regular" electrodes, such stresses may be distributed within the electrode relatively uniformly and not lead to mechanical failure. In contrast, if composite-comprising electrodes charge or discharge significantly faster than "regular" electrodes, the level of stress may be higher and, in some cases, may contribute to mechanical failure of the electrode. The "channel" pore presence may reduce such stresses to below the acceptable level for some applications. In the composite particle design in accordance with an embodiment of the disclosure, the presence of carbon as well as the presence of pores within the composite particles may contribute to stress reduction, and the presence of "channel" pores may also be advantageous for further stress reduction and/or other performance gains. In some designs, it may be advantageous for the average width or diameter or thickness of the "channel" pores to range from about 1 micron to about 500 microns (more preferably from around 5 micron to about 200 micron). Smaller than 1 micron channel pores within electrode may not provide sufficient advantages for some applications (particularly for composite particles in excess of about 1 micron in size) and could be expensive or challenging to produce. Larger than about 500 micron pores may reduce energy density and lead to local mismatch of the capacity on the anode and cathode and thus contribute to failure in some applications, particularly if the device charges or discharges quickly (e.g., faster than in 1 hour and even more so if faster than in 10 min). In some designs, it may be advantageous for the average spacing between the "channel" pores in the electrode to range from about 10 micron to about 10,000 microns (e.g., more preferably from around 50 micron to about 1000 micron). Smaller than 10 micron spacing may be more challenging to produce in some designs, and, most importantly, may lead to reduction in the volumetric energy density of the device. Larger than 10,000 micron spacing may provide limited benefits, if any. The shape of the "channel" pores may vary between different applications. In some illustrative examples, the shape of the "channel" pores within the electrode may be columnar/cylindrical, slit-like (or crack-like), "V" shaped, caterpillar-like, among many others. In some designs, the "channel" pores within the electrode may exhibit multiple branches (e.g., be dendritic) to further enhance ion transport rate and minimize stresses. The volume fraction of the "channel" pores may range from around 0.01 vol. % to around 30 vol. % (as a volume fraction of the electrode). A larger "channel" pore fraction may lead to undesirably significant reduction in the volumetric energy characteristics of the cell in some applications. In addition, in some cases a larger "channel" pore fraction may reduce mechanical properties of the electrode and contribute to premature failure. Formation of the "channel" pores may be induced by a mechanical component (e.g., by using an array of indenters), by using sacrificial templates, by forming "cracks" during electrode drying, by using laser micro-machining and/or other mechanisms. In some designs, the "channel" pores in the electrode may be induced before or after electrode calendaring (densification). In some designs, it may be advantageous to induce pores after partial calendaring (densification) but before the final calendaring (densification) to achieve a favorable combination of suitable electrode mechanical properties, densities and pore size while using a more favorable (e.g., more reliable or inexpensive or fast) "channel" pore formation process. In some designs, it may be advantageous to heat the electrodes (e.g., in addition to or separate from heat applied thereto during calendaring) during or after the introduction of the "channel" pores into the electrodes (but before filling the electrode with the electrolyte). Heating may reduce some of the induced stresses or favorably change mechanical properties of the electrode in some designs. The suitable temperature may vary and depend on multiple factors (e.g., the type and thermal properties of a binder used (if any), thermal stability of the current collector, thermal stability of the electrode, thermal stability of the conductive or other additives, electrode thickness, etc.). In an example, the heating temperature may range from around 40° C. to around 200° C. (although in some special designs higher temperatures may also be used—e.g., up to around 600° C.).

In some designs (e.g., to maximize rate performance or battery stability), it may be advantageous for such biomass-derived carbon comprising composite electrode to exhibit changes in the composition from the surface of the electrode towards the current collector. In one illustrative example, it may be advantageous for the top about 20-50% of the electrode to exhibit meaningfully higher (e.g., about 10% to about 300% higher) porosity (to be filled with electrolyte) than the bottom about 50-80% of the electrode (e.g., to optimize rate performance). As used herein, the "bottom" of the electrode is the part of the electrode that is nearest to a respective current collector, and the "top" of the electrode is the part of the electrode that is furthest from the respective current collector. In another illustrative example, it may be advantageous for the top about 20-50% of the electrode to comprise meaningfully smaller (e.g., from about 20% smaller to about 30 times smaller) average size of the composite particles than the bottom about 50-80% (e.g., to optimize rate performance and stability). In yet another illustrative example, it may be advantageous for the top about 20-50% of the electrode to comprise meaningfully more porous composite particles (e.g., composite particles with about 20% to about 50 times larger volume fraction of the pores within the composite particles) than the bottom about 50-80% (e.g., to optimize rate performance and stability). In yet another illustrative example, it may be advantageous for the bottom about 20-50% of the electrode to comprise meaningfully more conductive additives (e.g., about 10% to about 5 times larger mass fraction of the conductive additives) than the top about 50-80% (e.g., to optimize rate performance and stability). In yet another illustrative example, it may be advantageous for the bottom about 10-50% of the electrode to comprise meaningfully higher binder content (e.g., about 10% to about 5 times larger mass fraction or volume fraction of the binder per unit electrode mass or volume) than the top about 50-90% (e.g., to optimize rate performance and stability). In some designs (e.g., to maximize rate performance or battery stability), it may be advantageous for such biomass-derived carbon comprising composite electrode to contain a conductive interlayer between the current collectors (e.g., metal foils or porous metal foils or metal mesh or other suitable types of current collectors) and the electrode coating (e.g., comprising composite particles, conductive additives and a binder). Such a conductive interlayer may reduce contact resistance (which may become particularly important for devices that experience rapid charging or discharging) and additionally enhance adhesion and mechanical stability of the electrode. In addition, such an interlayer may allow one to reduce the fraction of the binder in the bulk of the electrode (e.g., for faster ion transport). In some designs, the thickness of such an interlayer may range from around 0.005 micron to around 5 microns (preferably, from around 0.05 micron to around 0.5 micron). Larger thickness may reduce energy density and lead to higher first cycle losses in some applications. However, too small of a thickness (e.g., below about 0.005 micron) may be less effective in improving adhesion to the current collector and in reducing interfacial resistance in some applications. The interlayer may comprise conductive additives (such as carbon nanotubes (either single walled or double walled or multiwalled) or carbon fibers or carbon nanofibers or carbon black or exfoliated graphite or graphene or other types of conductive carbon, metal nanowires, carbon or metal-coated fibers or nanofibers, conductive polymer, etc.) or mixtures of several distinctly different conductive additives and a binder (e.g., a polymer binder or carbonized/graphitized polymer binder). In some designs, the interlayer may be deposited by spray-coating process or by casting or by other mechanism of deposition from a slurry suspension or by electrostatic deposition or other mechanism. In some designs, it may be advantageous for the interlayer to be grown or deposited on the surface of the current collector (e.g., by vapor deposition technique such as chemical vapor deposition (CVD) or physical vapor deposition (PVD) including sputtering or by a solution growth method or by electrodeposition, etc.). In some designs, the porosity within the interlayer (e.g., filled with an electrolyte prior to battery use) may range from as little as about 0% to as high as about 99%. In some designs, the interlayer may be designed to intentionally separate from the current collector (e.g., upon excessive heat—e.g., above certain temperatures such as around 80-150° C. in one illustrative example) as a safety feature (e.g., to prevent a thermal runaway in a battery cell). This could be achieved, for example, by using a polymer that shrinks and/or loses adhesion to the current collector above a certain temperature. Alternatively, as another illustrative example the interlayer may become insulative above a certain temperature (e.g., due to a phase transformation).

In some designs, thus produced biomass-derived carbon/intercalation type active material composite particles may be further (at least partially) enclosed in a functional shelling layer (e.g., to enhance electrical conductivity or to enhance ionic conductivity or to enhance wetting by electrolyte or to prevent undesirable interactions between electrolyte and active material or for other advantageous purposes). In some designs, the shelling material layer may preferentially coat either the active material or the carbon walls (e.g., by having different wetting or different nucleating time on the carbon surface vs. that of the active material). In some designs, the volume fraction of the functional shelling layer may range from around 0.001 vol. % to around 20 vol. % of the volume of the composite particles. In some designs, the functional shelling material layer may also act as "active" material in terms of its ion storage capability (e.g., exhibit capacity in the range from around 0.1% to around 75% of that of the active material when expressed in the units of capacity per unit mass, mAh/g, or capacity per unit volume, mAh/cc). In some designs, such a shelling material layer may be deposited by using vapor deposition techniques (such as CVD, ALD, among others), electrochemical deposition, electrodeposition, electroless deposition, electrophoretic deposition, layer-by-layer deposition or various other solution-based deposition techniques or combination of both solution and vapor depositions. In some designs, after the shelling material deposition, the composite may be heat-treated (e.g., at temperatures from around 100 to around 1000° C.) in a suitable gaseous environment (e.g., inert gas, such as $N_2$ or Ar or He, among others) or vacuum to enhance composite properties. In some designs, the average thickness of the shelling material layer may vary depending on the particle size, ionic and electrical conductivity of such a layer and/or other properties. In some designs, a suitable thickness (e.g., average thickness) of the shelling material layer may range from around 0.2 nm to around 200 nm, although a larger thickness may also be acceptable in some applications (although possibly at the expense of reduced volumetric capacity of the electrodes or reduced electrode porosity). In some designs, the shelling material layer may comprise carbon (C) (e.g., in some designs, mostly conductive $sp^2$-bonded carbon, as in graphite or graphitic carbon or turbostratic carbons or most amorphous carbons). In some designs, various carbon atoms comprising solvents or various hydrocarbon (e.g., $C_5H_{12}$, $C_5H_{10}$, $C_5H_8$, $C_6H_6$, etc.) vapors may be used as precursors for carbon deposition. In some designs, hydrocarbon gases (e.g., $CH_4$, $C_2H_2$, $C_2H_4$, $C_2H_6$, $C_3H_6$, $C_3H_8$, $C_3H_4$, $C_4H_{10}$, $C_4H_8$, $C_4H_6$, etc.) or their combinations may advantageously be used as precursors for carbon deposition. In some designs, viscoelastic polymers (including bio-derived ones, such as pitch) may be used as precursors for carbon layer formation. In some designs, the pitch may be derived from petroleum, coal tar, plants (including wood). In some designs, the shelling material layer may be a composite of two more materials. In some designs, the shelling material may comprise flake-shaped particles. In some designs, the shelling material may comprise one or more of the following elements: transition, alkali or alkaline-earth metal (such as iron (Fe), manganese (Mn), copper (Cu), yttrium (Y), zirconium (Zr), niobium (Nb), molybdenum (Mo), chromium (Cr), lithium (Li), sodium (Na), magnesium (Mg), potassium (K), calcium (Ca), strontium (Sr), cesium (Cs), barium (Ba), among others), lanthanum or lanthanoids (La, Ce, Gd, Nd, Eu, etc.), beryllium (Be), aluminum (Al), silicon (Si), gallium (Ga), germanium (Ge), phosphorous (P), arsenic (As), tin (Sn), bismuth (Bi), lead (Pb), indium (In), cadmium (Cd), zinc (Zn), fluorine (F), iodine (I), oxygen (O), nitrogen (N), sulfur(S), selenium (Se), tellurium (Te), hydrogen (H) and carbon (C). In some designs, the shelling material layer may comprise a polymer. In some designs, a polymer used in the shelling material layer may exhibit high electrical and/or ionic conductivity (e.g., in the range from around $10^{-7}$ to around $10^{+4}$ S/cm). In some designs, a polymer layer in the shelling material layer may be at least partially carbonized. In some designs, the shelling material layer may comprise a glass or ceramic layer. In some designs, a glass or ceramic layer may exhibit high electrical and/or ionic conductivity (e.g., in the range from around $10^{-7}$ to around $10^{+4}$ S/cm). In some designs, the shelling material layer may comprise a metal or metal alloy.

In some designs, biomass-derived carbon comprising composite particles may be produced by first producing porous biomass-derived carbon and then infiltrating the pores with intercalation-type or pseudocapacitive-type active materials. In some designs, such an infiltration process may be conducted by using vapor deposition techniques (such as CVD, atomic layer deposition (ALD), among others) or solution infiltration techniques (including a sol-gel or hydrothermal synthesis or layer-by-layer deposition or electrodeposition or electroless deposition or electrophoretic deposition or salt infiltration followed by solvent evaporation and decomposition or conversion in a controlled environment, among others) or melt-infiltration (e.g., infiltrating a precursor or a component of a precursor from a melt) or various combination(s) of more than one of such techniques (e.g., an infiltration of a precursor (e.g., inorganic or metal-organic or organometallic, etc.) salt(s) from solution or vapor phases or melt followed by annealing or heat-treatment in controlled gaseous environment-reducing (e.g., in $H_2$ or hydrogen-containing gases such as hydrocarbon gases or vapors, among others) or oxidizing (e.g., in O or F or Cl or S containing gases, among others) or neutral (e.g., as $N_2$ or Ar or He gases or vacuum), where the gaseous environment may comprise molecules comprising fluorine or hydrogen or oxygen or sulfur or phosphorous or lithium or sodium or potassium or calcium atoms, etc.). As such, in some designs, precursors may first be infiltrated and then converted to suitable intercalation-type or psuodocapacitive-type active materials by, for example, heat-treatment under a suitable gaseous (or vaporous) environment. In some designs, as previously mentioned, an additional shelling material layer may at least partially enclose (or coat) active materials, carbon or the whole composite particles. The maximum heat-treatment (e.g., in a controlled environment) temperature of such processes during the composite formation may vary depending on composite properties and composition of the intercalation-type active material (e.g., its thermal stability, mobility, reactivity in contact with carbon, etc.), but may be in a range from around 100° C. to around 1,100° C. (sometimes, from around 300 to around 800° C.). In some designs, more than one heat-treatment in different gaseous environments (e.g., initially in O- or F-containing and then in Ar or $N_2$) at different temperatures (e.g., from around 50° C. to around 1,100° C.) or pressures (e.g., from around 0.0001 Torr to 20,000 Torr; in some designs—near atmospheric pressure) and/or for different time durations (e.g., from around 0.0001 sec to around 240 hours) may be implemented to tune material synthesis (e.g., for the formation of composites with a desired active particle size residing primarily within the carbon pores and with a desired phase and stoichiometry of active material particles, etc.).

The biomass in the described above biomass-derived carbon comprising composite particles may come from a very broad range of sources. Furthermore, the properties of such biomass-derived carbon may vary broadly. However, certain specific types of biomass, certain ways of converting the biomass into carbon and/or certain properties of the biomass-derived carbon may be particularly attractive for certain battery designs (such as Li-ion batteries and others) and other types of electrochemical energy storage applications.

Renewable biomass-derived carbon from the following precursors were found to be particularly attractive for certain biomass-derived carbon-comprising composite particles based on intercalation-type active particles: (i) nut shells, particularly coconut shells, apricot shells, almond shells, among others; (ii) pits, such as olive pits, cherry stone, apricot stone, peach stone, avocado stone, among others; (iii) wood, including waste wood products; (iv) bamboo; (v) grass/straw and (dry) leaves, including banana fibers, rice husk, corncob, kelp, among others; (vi) corn grain; (vii) plane tree fluff, (viii) natural carbohydrates (including saccharides), such as cellulose, chitin, alginate, sucrose and glucose, and starch, among others, or (ix) any combination thereof. The morphology of the biomass-derived carbon-comprising composite particles may typically provide sufficient insights to identify the biomass source (precursor) of the corresponding carbon. The shapes and patterns of the pores and other structural features of the biomass-derived carbons (e.g., from various plant sources) are often very unique as they follow the inhomogeneity of the evolution-affected natural plant growth.

In some designs, it may be advantageous for the biomass-derived porous carbon particles to exhibit an average so-called BET specific surface area (SSA) (as measured by $CO_2$, $N_2$, $H_2$ or Ar gas sorption) in the range from about 400 $m^2$/g to about 5,000 $m^2$/g (prior to forming composites) and a pore volume in the range from around 0.4 $cm^3$/g to around 6 $cm^3$/g. In some designs, the suitable BET SSA may range from about 1000 $m^2$/g to about 3,000 $m^2$/g. BET SSA larger than 5,000 $m^2$/g may make it difficult to handle and produce composites, may also lead to inferior performance in some designs and, in some cases, be too expensive (for battery applications) to produce and handle. BET SSA smaller than 400 $m^2$/g may undesirably limit rate performance and/or volumetric capacity (or capacitance) or other important properties of the composites in some electrochemical energy storage applications.

In some designs, it may be advantageous for the biomass-derived porous carbon particles to exhibit open porosity in the range from about 35 vol. % to about 93 vol. % and the total open pore volume (e.g., void space) in the range from about 0.3 $cm^3$/g to about 6 $cm^3$/g, as determined by gas sorption (e.g., $CO_2$, $N_2$, $H_2$, Ar, etc.) or other suitable measurements. In some designs, the suitable pore volume may range from about 0.6 $cm^3$/g to about 3.5 $cm^3$/g (in some designs—from about 0.75 $cm^3$/g to about 2.5 $cm^3$/g). Pore volume larger than 6 $cm^3$/g may make it difficult to handle and produce composites, may also lead to inferior performance in some designs and, in some cases, be too expensive (for battery applications) to produce and handle. Pore volume smaller than about 0.3 $cm^3$/g may undesirably limit volumetric capacity of the composites (and thus volumetric energy density of the cells) and thus limit its usefulness in some applications.

In some designs, it may be advantageous for the biomass-derived porous carbon to exhibit compositional purity of more than about 90 wt. % (e.g., less than 10 wt. % non-carbon species) prior to forming composites, as determined by chemical composition, energy dispersive spectroscopy (EDS), thermo-gravimetric analysis (TGA), combustion analyzer, X-ray photoelectron spectroscopy (XPS) or other suitable mechanism. In some designs, purity of more than about 96 wt. % is further advantageous in some designs. In some designs, the so-called "ash" content should preferably be less about 10 wt. % (e.g., preferably less than about 4 wt. %, more preferably less than about 2 wt. %, even more preferably less than about 1 wt. %, and most preferably below about 0.25 wt. %). In some designs, a higher content of various impurities (e.g., K, S, Ca, Na, Zn, P, O, etc.) may induce side reactions, significantly reduce cycle stability (particularly at elevated temperatures), induce premature failure, reduce gravimetric and volumetric energy storage characteristics, reduce power density, lead to undesirably larger cell-to-cell or batch-to-batch variations and possibly induce some sort of other undesirable outcomes that reduce performance characteristics of electrochemical cells (e.g., Li-ion batteries). To attain high purity biomass-derived porous carbon, it may be advantageous to use a combination of chemical (e.g., treatment in acids) and thermal (e.g., heat-treatment at temperatures from around 800° C. to around 2000° C. and evaporation of impurities) purification stages.

In some designs, it may be important for the biomass-derived porous carbon to comprise less than about 10 wt. % (e.g., preferably less than about 2 wt. %, more preferably less than about 0.5 wt. %) of hydrogen atoms (e.g., present within its structure or as part of the functional groups). In some designs, higher hydrogen content (e.g., above about 10 wt. %) may lead to the undesirable formation of gases and cell swelling, reduced capacity utilization, reduced cycle stability, higher first cycle losses and/or other undesirable reductions in performance characteristics. The hydrogen content may be determined by using a hydrogen analyzer, titration, nuclear reaction analysis (NRA), Devanathan-Sta-churski method, combustion CHN analysis, Instrumental Gas Analysis (IGA), scanning Kelvin probe force micros-copy (SKPFM) and other suitable characterization mecha-nism.

In some designs, it may be advantageous to use so-called physical activation techniques (such as activation in a stream of $CO_2$ or $H_2O$ or both, among others) to induce additional pores and increase pore volume and surface area of bio-derived carbons. In some designs, suitable activation tem-perature may vary depending on the types of the carbons and pre-treatment history. However, in some designs, the suit-able temperature may range from around 700° C. to around 1300° C. (in some designs—from around 800 to around 1150° C.). In some applications, temperatures higher than about 1300° C. may make the activation process difficult to control to a desired uniformity and may additionally induce undesirable pore size distribution within carbon. In some applications, temperatures lower than about 700° C. may make the activation process too slow and may not achieve the desired pore size and surface area characteristics in the produced activated bio-derived carbon. In some designs, formation of so-called hydrochars (carbons produced by hydrothermal treatment of the hydrocarbon precursors, including various biomaterials, such as shells, wood wastes, etc.) may be advantageous prior to activation. In some designs, biomaterial precursors may be annealed in an inert environment (e.g., in vacuum or in $N_2$ or Ar or He gas, etc.) prior to activation. Suitable temperatures may range from about 500° C. to about 2800° C., depending on the precursor and the desired porosity after activation. In some designs, heat-treatment at temperatures lower than about 500° C. may have little impact on activation and may not remove (a desired) amount of impurities (e.g., as effluent(s)). In some designs, heat-treatment at temperatures higher than about 2800° C. is very effective in obtaining high-purity material, but may prevent one from achieving high BET SSA and retaining (sometimes desirable) small pores after activation. In some designs, chemical activation may be used instead or in addition to (e.g., in combination with) physical activation. Examples of suitable chemical activation agents include, but are not limited to KOH, NaOH, $ZnCl_2$, $H_3PO_4$, $K_2CO_3$, or $H_2SO_4$. In some designs, the carbonization stage proceeds concurrently with the chemical activation. In other designs, after carbonizing the bio-derived precursor, the obtained carbon may then be mixed with chemical activation agent, heat-treated for activation and then purified. In some designs, chemical activation may be preferred over physical activation owing to the lower temperatures and shorter time needed for activating materials as well as sometimes higher BET SSA achievable at higher yield and formation of higher volume of smaller pores (e.g., pores in the range from about 0.4 to about 4 nm).

In some designs (e.g., to maximize rate performance or battery stability), it may be advantageous for such biomass-derived carbon (used in the composite electrodes) to be heat-treated (annealed in a controlled environment) after activation (and optional purification) process. In some designs, the annealing process may provide additional puri-fication, may enhance electrical conductivity of carbon, may enhance mechanical properties of carbon, may reduce the number of nucleation cites (for deposition of active mate-rials) and/or may lead to reduced self-discharge and other performance benefits in cells (e.g., better rate, better stabil-ity, etc.). In some designs, suitable temperatures for the annealing may range from about 400° C. to about 2400° C., depending on the precursor, gas composition and pressure, porosity and microstructure of the activated carbon particles, desired purity and the desired porosity after activation. In some designs, higher temperatures for the annealing may generally result in fewer nucleation cites and higher purity. However, in some designs, too high of a temperature may undesirably reduce BET SSA and pore volume, close some of the pores, make the material too hydrophobic (e.g., if annealing is conducted in an inert environment or vacuum) and/or induce other shortcomings. In some designs, anneal-ing may advantageously be done both before and after activation of carbon.

In some designs, it may be advantageous to mix (e.g., milled) bio-derived carbon (including, but not limited to exfoliated carbon, activated carbon, carbon black, etc.) with bio-polymers (such as starch, various sugars, cellulose and cellulose-derived products, alginate and alginate-derived products, plant-derived pitch, gum arabic, various other natural polysaccharides, natural glycoproteins and their mix-tures, among others) and active material (nano) particles or precursor (e.g., salts; including salt solutions) (either in a dry state or in a solution/suspension) and carbonize to obtained biomass-derived carbon-containing composites. In some designs, such mixtures may comprise just bio-polymers and active material (or active material precursor) (without bio-derived carbon particles). In some designs, it may be advan-tageous to utilize a spray-drying technique or a spray pyrolysis technique as at least one of the stages in composite synthesis. In some designs, it may be advantageous to utilize hydrothermal (or solvothermal) treatment during at least one of the stages in composite synthesis (e.g., to induce oxida-tion or crystallization of the precursor at relatively low temperatures without burning/over-oxidizing carbon, etc.). In some designs, it may be advantageous to utilize hydro-thermal treatment in combination with heat-treatment in a controlled environment (e.g., a reactive environment such as oxygen-containing or fluorine-containing at low tempera-tures (e.g., from around room temperature to around 350-

400° C.) or inert at higher temperatures (e.g., from around 400° C. to around 600-1200° C., depending on a particular chemistry and its stability of active material in contact with carbon) or both). In some designs, polymers or carbon produced not from a renewable biomass but from nonrenewable hydrocarbons (e.g., petroleum pitch, coal tar, etc.) may be effectively used as well. In an example, the temperature of the pyrolysis or the subsequent (to spraying) heat treatment may vary depending on the active material composition, and may range from around 300° C. to around 1200° C. (in some designs, from around 450° C. to around 1000° C.). In some designs, higher temperatures may lead to the undesirable reaction of active material or active material with carbon forming carbides and other undesirable compositions. In some designs, lower temperatures may limit rate performance and capacity of the produced composites.

Illustrative examples of suitable Li-containing Li-ion intercalation-type active materials for use in biomass-derived carbon-comprising nanocomposites include, but are not limited to, lithium titanium oxide (e.g., $Li_4Ti_5O_{12}$), lithium cobalt oxide ($LiCoO_2$, or LCO, or $LiCo_2O_4$), lithium nickel oxide ($LiNiO_2$, or LNO), lithium manganese oxide ($LiMnO_2$ or LMO, or $Li_2MnO_3$, or $LiMn_2O_4$, among others), lithium nickel cobalt aluminum oxide ($LiNi_{0.8}Co_{0.15}Al_{0.05}O_2$, or $LiNi_xCo_yAl_zO_2$, where typically $x+y+z≤1$, or NCA), lithium nickel manganese oxide ($LiNi_{0.5}Mn_{0.5}O_2$, or $LiNi_xMn_yO_2$, where typically $x+y≤1$, or NMO), lithium nickel cobalt manganese oxide ($LiNi_{0.33}Co_{0.33}Mn_{0.33}O_2$, or $LiNi_xCo_yMn_zO_2$, where typically $x+y+2≤1$, or NCM, or NMC), or lithium titanium sulfite ($LiTiS_2$), or lithium iron phosphate ($LiFePO_4$, LFP), or lithium manganese phosphate ($LiMnPO_4$), lithium cobalt phosphate ($LiCoPO_4$), lithium nickel phosphate ($LiNiPO_4$), lithium vanadium fluoro phosphate ($LiVFPO_4$), lithium iron fluoro sulfate ($LiFeSO_4F$), various Li excess materials (e.g., lithium excess (rocksalt) transition metal oxides and oxyfluorides such as $Li_{1.211}Mo_{0.467}Cr_{0.3}O_2$, $Li_{1.3}Mn_{0.4}Nb_{0.3}O_2$, $Li_{1.2}Mn_{0.4}Ti_{0.4}O_2$, $Li_{1.2}Ni_{0.333}Ti_{0.333}Mo_{0.133}O_2$ and many others), various high capacity Li-ion based materials with partial substitution of oxygen for fluorine or iodine (e.g., rocksalt $Li_2Mn_{2/3}Nb_{1/3}O_2F$, $Li_2Mn_{1/2}Ti_{1/2}O_2F$, $Li_{1.5}Na_{0.5}MnO_{2.85}I_{0.12}$, among others) and many other types of Li-containing disordered, layered, tavorite, olivine, or spinel type active materials or their mixtures comprising at least oxygen or fluorine or sulfur and at least one transition metal. In addition to Li-based, other examples of intercalation-type active materials may be based on (e.g., similar) Na-ion intercalation compounds, K-ion intercalation compounds, Ca-ion intercalation compounds, among others. In addition to Li-containing (or Na-containing, K-containing, Ca-containing, etc.) intercalation compounds, Li-free (or Na-free, K-free, Ca-free, etc.) version(s) of such or similar materials may be utilized (e.g., titanium oxide or oxyfluoride, niobium oxide or oxyfluoride, cobalt oxide or oxyfluoride, nickel oxide or oxyfluoride, nickel-aluminum oxide or oxyfluoride, nickel-cobalt-manganese oxide or oxyfluoride, nickel-cobalt-aluminum oxide or oxyfluoride, iron oxide or oxyfluoride, iron phosphate, many others and their various mixtures, etc.).

In addition to or instead of intercalation-type active materials, some designs of the biomass-derived carbon-comprising nanocomposites may comprise so-called pseudocapacitive (or mixed pseudocapacitive-intercalation-type) active materials. Suitable examples of pseudocapacitive (or mixed pseudocapacitive-intercalation-type) active materials include, but are not limited to, various (including mixed metal) oxides, hydroxides, oxy-hydroxides, nitrides, oxynitrides, nitrates, phosphates, (oxy)phosphates, sulfides, sulfate hydroxide and other inorganic salts of Ru, Fe, Mn, Cu, Ti, Bi, V, Ni, Nb, Cc, Zr, Ta, Co, Sn, Sb, Si, In, Zn, Mo, Pb, La, Y and their various mixtures and derivatives. Such compounds may also comprise Li, Na, Ca, Cs, Mg and K. In some designs, such compounds may comprise two, three, four or more metals. In some designs, such compounds may comprise at least one transition metal.

Conversion-type cathode and anode materials for rechargeable Li-ion or Li batteries may offer higher energy density, higher specific energy, or higher specific or volumetric capacities compared to intercalation-type cathode and anode materials.

For example, fluoride-based cathodes may offer outstanding technological potential due to their very high capacities, in some cases exceeding about 300 mAh/g (greater than about 1200 mAh/cm³ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_2$ offers a theoretical specific capacity of 302 mAh/g; $BiF_3$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g. Mixtures (for example, in the form of alloys) of fluorides may offer a theoretical capacity approximately calculated according to the rule of mixtures. The use of mixed metal fluorides may sometimes be advantageous (e.g., may offer higher rates, lower resistance, higher practical capacity, or longer stability). In a fully lithiated state, metal fluorides convert to a composite comprising a mixture of metal(s) and LiF clusters (or nanoparticles). Examples of the overall reversible reactions of the conversion-type metal fluoride cathodes may include $2Li+CuF_2 ↔ 2LiF+Cu$ for $CuF_2$-based cathodes or $3Li+FeF_3 ↔ 3LiF+Fe$ for $FeF_3$-based cathodes). It will be appreciated that metal fluoride-based cathodes may be prepared in both Li-free or partially lithiated or fully lithiated states.

In some designs, the use of so-called Li-air cathodes (e.g., cathodes with active material in the form of $Li_2O_2$, $Li_2O$, LiOH in their lithiation state) or similar metal-air cathodes based on Na, K, Ca, Al, Fe, Mn, Zn and other metals (instead of Li) may similarly be beneficial due to their very high capacities. In some designs, such cathode active materials should ideally reversibly react with oxygen or oxygen containing species in the electrochemical cell and may fully disappear upon full de-lithiation (metal removal). These are also considered to belong to conversion-type cathodes.

Another example of a promising class of conversion-type cathodes (or, in some cases, anode) materials is sulfur(S) (in a Li-free state) or lithium sulfide ($Li_2S$, in a fully lithiated state) or other metal sulfides. In order to reduce dissolution of active material during cycling, to improve electrical conductivity, or to improve mechanical stability of $S/Li_2S$ electrodes, certain designs may advantageously utilize porous S, $Li_2S$, porous S—C(nano) composites, $Li_2S$—C (nano) composites, $Li_2S$-metal oxide (nano) composites, $Li_2S$—C-metal oxide (nano) composites, $Li_2S$—C-metal sulfide (nano) composites, $Li_2S$-metal sulfide (nano) composites, $Li_2S$—C-mixed metal oxide (nano) composites, $Li_2S$—C-mixed metal sulfide (nano) composites, porous S-polymer (nano) composites, or other composites or (nano) composites comprising S or $Li_2S$, or both. In some designs, such (nano) composites may advantageously comprise conductive carbon. In some designs, such (nano) composites may advantageously comprise metal oxides or mixed metal oxides. In some designs, such (nano) composites may advantageously comprise metal sulfides or mixed metal sulfides. In some examples, mixed metal oxides or mixed metal sulfides may comprise lithium metal. In some examples, mixed metal oxides may comprise titanium or vanadium or manganese or iron metal. In some examples, lithium-comprising metal oxides or metal sulfides may exhibit a layered structure. In some examples, metal oxides or mixed metal oxides or metal sulfides or mixed metal sulfides may advantageously be both ionically and electrically conductive (e.g., in the range from around $10^{-7}$ to around $10^{+4}$ S/cm). In some examples, various other intercalation-type active materials may be utilized instead of or in addition to metal oxides or metal sulfides. In some designs, such an intercalation-type active material exhibits charge storage (e.g., Li insertion/extraction capacity) in the potential range close to that of S or $Li_2S$ (e.g., within about 1.5-3.8 V vs. $Li/Li^+$).

Conversion-type anodes may offer specific capacities much higher than graphitic carbon through reactions generalized by: $nLi+M_aX_b \leftrightarrow aM+bLi_nX$, where M may be a metal or semimetal (intermetallic), X is an anion (e.g., O in the case of anodes, but may also be N, S, P, F, etc.) or hydrogen (H). Suitable examples of such conversion-type active anode materials include, but are not limited to, various oxides, nitrides, sulfides, phosphides, fluorides, hydrides, etc. In some designs, these may include fully or partially oxidized non-carbon group IV elements (e.g., oxides or nitrides or sulfides or phosphides of those elements with the atomic number of 14, 32, 50 or 82), oxides or nitrides or sulfides or phosphides of Al (atomic number 13), Ga (atomic number 31), In (atomic number 49), Sb (atomic number 51), Pb (atomic number 82), Bi (atomic number), Fe (atomic number 26), Ti (atomic number 22), Mn (atomic number 25), Cu (atomic number 29), Ni (atomic number 28), Co (atomic number 27), V (atomic number 23), and Zn (atomic number 30), among others.

Unfortunately, many conversion-type active electrode materials (including those described above) that may be used in Li or Li-ion batteries suffer from various performance limitations. Formation of biomass derived carbon-comprising (nano) composites may, at least partially, overcome such limitations. For example, biomass derived carbon-comprising (nano) composites may offer reduced voltage hysteresis, improved capacity utilization, improved stability, improved rate performance, improved mechanical and sometimes improved electrochemical stability (e.g., more stable cathode solid electrolyte interphase, CEI, or anode solid electrolyte interphase, SEI), reduced volume changes, and/or other positive attributes.

Alloying-type active anode materials for use in Li-ion batteries offer higher gravimetric and volumetric capacities compared to intercalation-type anodes. Alloying-type active anode materials also may offer lower irreversible first cycle losses compared to conversion-type anode materials (such as various oxides, nitrides, sulfides, phosphides or hydrides, etc.). However, such materials commonly suffer from very significant volume expansion during Li insertion and thus may induce thickness changes and mechanical failure of the anodes or their separation from the current collectors or damages in the current collectors (e.g., Cu foils). In addition, some of such anode materials suffer from relatively low electrical conductivity and relatively low ionic (Li-ion) conductivity. Volume changes in such materials upon electrochemical cycling may also induce damages in the SEI and continuous electrolyte decomposition and irreversible Li losses. In some designs, formation of biomass-derived carbon-based (nano) composite particles comprising such alloying-type active particles (including, but not limited to non-carbon group IV elements (e.g., those elements with the atomic number of 14, 32, 50 or 82) as well as Al (atomic number 13), B (atomic number 5), P (atomic number 15), Zn (atomic number 30), In (atomic number 49), Ga (atomic number 31), As (atomic number 33), Cd (atomic number 48), In (atomic number 49), Sb (atomic number 51), Pb (atomic number 82), Bi (atomic number 83) and their various mixtures and alloys, among others) may reduce volume changes during Li-ion insertion and extraction, enhance conductivity, enhance capacity utilization, improved rate performance, improved mechanical and sometimes improved electrochemical stability (e.g., more stable solid electrolyte interphase, SEI), reduced volume changes, and other positive attributes in rechargeable metal-ion (e.g., Li-ion) cells, among others.

In some designs, formation of biomass derived carbon-comprising (nano) composites with alloying-type active materials may, at least partially, overcome such limitations. For example, they may offer reduced voltage hysteresis, improved capacity utilization, improved stability, improved rate performance, improved mechanical and sometimes improved electrochemical stability (e.g., more stable SEI), reduced volume changes, and/or other positive attributes.

Metal anodes for use in metal batteries (e.g., Li metal anodes or Li-alloy metal anodes for primary or rechargeable Li metal batteries) offer higher gravimetric and volumetric capacities compared to intercalation-type anodes. Most commonly, such metal anodes are used in the form of metal foils that are either used directly in a cell construction or are deposited on a current collector during the first charge (after the cell construction) using metal ions (e.g., Li ions) from the Li-containing cathode active material. Suitable examples of materials for metal current collectors for Li metal batteries include, but are not limited to, various metal foils that do not alloy with Li metal, such as Ni or Ti or steel or Cu foils, various Ni-based, Ti-based, Fe-based or Cu-based alloy foils, among others. While the gravimetric and volumetric capacities of such Li metal foil anodes are very high, such anodes suffer from various instabilities (e.g., pulverization, dendrite formation, volume-changes, separation from current collectors, undesirable reactions with electrolytes that lead to irreversible capacity losses and anode expansion, resistance growth, etc.) and slow maximum charge and discharge rates, particularly for electrodes with medium areal capacity (e.g., about 2-4 $mAh/cm^2$) and even more so for electrodes with high areal capacity (e.g., 4-16 $mAh/cm^2$) cell designs.

In some designs, formation of biomass derived carbon-comprising (nano) composites with Li metal (or other suitable metals for metal batteries) may, at least partially, overcome such limitations. For example, biomass-derived carbon-lithium metal composites may offer reduced voltage hysteresis, improved capacity utilization, improved stability, improved rate performance, improved mechanical and sometimes improved electrochemical stability (e.g., more stable SEI), reduced volume changes, and/or other positive attributes. In some designs, such composites may advantageously comprise other material(s) in addition to biomass-derived carbon and lithium metal (e.g., other types of carbon, oxides, oxyfluorides, nitrides, polymers, etc.). In some designs, such composites may be in the form of particles that are cast and formed into an electrode using a binder by suitable mechanism (e.g., slurry coating, drying, calendaring and optionally coating with an additional layer or dry electrode coating and calendaring and optionally coating with an additional layer). In some designs, such composites may at least partially form during the first charge (after the cell construction) using metal ions (e.g., Li ions) from the Li-containing cathode active material. For example, Li metal may plate (be electrodeposited) inside the pores of biomass-derived carbon during the first charge. In some designs, it may be advantageous for at least a portion of such pores (e.g., about 10-100% of the pores) to remain free from electrolyte and available for Li metal deposition during cell operation. In some designs, pores within biomass-derived porous carbon may be closed by forming a shell before or after the electrode fabrication. In some designs, solid electrolytes (e.g., polymer or inorganic or polymer-inorganic composite) may be advantageously utilized instead of liquid electrolytes in order to reduce side reactions, reduce first cycle capacity losses, reduce Li-dendrite formation and/or improve cell safety.

In some designs, the relatively poor performance characteristics and limited cycle stability of alloying, metal and conversion-type electrodes may become particularly poor if electrode capacity loading is moderate (e.g., about 2-4 $mAh/cm^2$) and even more so if it is high (e.g., about 4-16 $mAh/cm^2$). One or more embodiments of the present disclosure are directing to overcoming some of the above-discussed challenges via the formulation of substantially more stable electrodes in moderate (e.g., about 2-4 mAh/ $cm^2$) and high capacity loadings (e.g., about 4-16 $mAh/cm^2$) with alloying, metal and conversion-type active materials.

While a broad range of alloying-type, metal, conversion-type active materials (and, as previously described various intercalation-type and pseudocapacitor-type active materials) may be successfully utilized in the construction of biomass-derived carbon containing composites, it may be advantageous in some designs (e.g., when active material is loaded into composite particles or electrodes prior to electrode assembling into cells) to employ those active materials that have partial vapor pressure below around $10^{-10}$ torr at around 400 K (preferably below $10^{-13}$ torr at around 400 K). For example, in some designs, electrodes may need to be dried at around 400 K prior to cell assembling and substantial evaporation of active material may not only induce contamination and create safety hazard, but also severely reduce electrode uniformity and the resulting cell performance. In some designs, the electrodes may be assembled from the electrode composition (e.g., comprising the composite particles) while in a discharged state.

In many applications and electrode designs, batteries with conversion-type (incl. alloying-type and metal-type) active electrode materials (cathode and anode materials) may exhibit acceptable (at least for some applications) charge and discharge rates (e.g., charging to about 80% of the maximum capacity within about 60-1200 minutes), but may suffer from insufficient cycle stability (e.g., below about 200 cycles to about 80% of the initial capacity) or large internal resistance or significant volume changes that induce damages in the current collector, separator, cell packaging integrity, the electrodes itself, cell-level irreversible swelling or other undesirable outcomes unless an amount of the conversion-type active material in the electrodes is small (e.g., about 0.1-5 wt. %) or moderate (e.g., about 5-20 wt. %).

In some applications, it may be advantageous to overcome one or more of the above-discussed above limitations and achieve smaller swelling, better stability and/or lower resistance via formation of composites comprising such conversion-type (incl. alloying-type and metal-type) active materials and using such composites in the electrodes for batteries. Electrodes may comprise 100% of such composites with conversion-type materials (not counting the binder, conductive and other additives as well as the current collectors) or may comprise a mixture of the composites and intercalation-type active materials. In an example, a suitable mass fraction of the composite particles in such "mixed" electrodes may range from about 1 to about 100 wt. % of all the active material particles in a given electrode (not counting the wt. of the binder, conductive and other additives as well as the wt. of the current collectors), depending on the requirements and demands of an application. In some designs, it may further be advantageous for such composites to comprise carbon due to carbon's high electrical conductivity, acceptable mobility for Li and other ions and good chemical and electrochemical resistance. In some designs, it may be advantageous for such carbon to comprise mostly (e.g., about 90-100%) $sp^2$-bonded carbon atoms (e.g., in order to attain high electrical conductivity or for other performance benefits). In some designs, it may be advantageous for the carbon to be sufficiently electrically conductive (e.g., with electrical conductivity in the range from about 1 S/m to about $10^6$ S/m). In some designs, it may be advantageous (for performance, morphology, scalability and cost reasons, among others) for the carbon to be derived from biomass (including natural and renewable biomass).

In some designs, it may be advantageous (e.g., to accommodate volume expansion upon lithiation if active materials are used in a non-lithiated state) for such biomass-derived carbon comprising composites to comprise pores. In some designs (e.g., for anodes and metal fluoride cathodes), it may be advantageous for all or at least the majority (e.g., about 50-100 vol. %; in some designs from around 75 vol. % to around 100 vol. %) of the pores to remain sealed and not to be directly accessible by an electrolyte (e.g., by electrolyte solvent molecules in case of liquid electrolytes or by a solid electrolyte in case of solid electrolyte comprising cell) or specific components of the electrolyte once the composite is produced and used in a cell. In some designs, this inaccessibility by electrolyte may be attained by sealing some of the pores before or after electrode assembling. In some designs (e.g., in case of solid electrolytes), this inaccessibility by electrolyte may be attained by electrolyte not being able to wet the inner pores during electrolyte infiltration. In some designs, it may be advantageous for at least some portion (e.g., about 1-100 vol. %) of the pores to exhibit characteristic dimensions (e.g., diameter or width) in the range from about 0.3 nm to around 600 nm. In some designs, it may be advantageous (e.g., to maximize volumetric capacity of the electrodes, while attaining desired stability) for at least some fraction (e.g., at least about 0.1-30 vol. %) of the pores to exhibit characteristic dimensions in the range from about 3 nm to 60 nm. In some designs, it may be advantageous (e.g., to attain the desired stability) for at least some fraction (e.g., about 30-100 vol. %) of the pores to exhibit characteristic dimensions in the range from about 0.4 nm to about 15 nm. In some designs, it may be advantageous (e.g., to improve stability and minimize volume changes while attaining high capacity) for at least some fraction (e.g., about 30-100 vol. %) of the pores to exhibit characteristic dimensions in the range from about 0.5 nm to about 10 nm. In some designs (e.g., to maximize volumetric capacity of the electrodes), it may be advantageous for the volume fraction of the pores in such composites to be no more than about 5-100% of the volume required for volume expansion of active material upon full lithiation.

Apart from the air cathodes, in some designs (e.g., to maximize energy storage characteristics, such as power or energy density or cycle stability or to achieve a compromise between these or other characteristics), it may be advantageous for the so-called Brunauer-Emmett-Teller (BET) specific surface area (SSA) or density functional theory (DFT) SSA of the composite electrode materials (e.g., as measured using $N_2$ or Ar or $CO_2$ or $H_2$ sorption technique and analyzed using BET or DFT methods) to range from about 0.2 $m^2$/g to about 100 $m^2$/g. In some applications, a larger SSA may lead to faster degradation and lower electrode density.

In some designs, the average size (e.g., diameter or thickness) of conversion-type active particles (including alloying-type particles or metal particles or layers within the biomass-derived carbon comprising composite electrode particles) to range from around 0.5 nm to around 200-300 nm (in some designs, preferably, from around 1 nm to around 60-100 nm; in some designs—from around 2 nm to around 20-30 nm). Too large size may induce stress concentrations during volume changes in some designs, leading to mechanical fracture of composites during cycling. In addition, most conversion-type active materials undergo electrochemical reactions rather slowly and smaller dimensions enhance rate performance. Too small size may lead to undesirable side-reactions or too small mass loadings of intercalation-type or pseudocapacitive-type particles within such composites in some designs, thus limiting energy characteristics of the energy storage devices built with these composite particles.

In some designs, the conversion-type active particles (including alloying-type particles or metal particles or layers) particles (of the composite electrode particles) may preferably be located inside the pores of the biomass-derived carbon particles. In some designs, it may be preferable for at least a meaningful portion of such pores (e.g., about 20 to about 100%) to remain sealed (e.g., with a shell material layer) so that electrolyte does not come into direct contact with the conversion-type active material.

In some designs, it may be advantageous for the active (e.g., conversion-type or alloying-type or metal) materials to be protected (from undesirable interactions with electrolyte) by a protective surface (shell) layer. In some designs, the suitable thickness of the protective surface layer may range from about 0.3 to about 60 nm. In some applications, a smaller thickness is less effective, while a larger thickness may lead to reduced rate performance of reduced volumetric and gravimetric energy densities. In some examples, the protective surface layer may comprise carbon. In some examples, the protective surface layer may comprise an oxide, a fluoride, an oxyfluoride, a sulfide, a nitride, an oxynitride, a nitride fluoride, a phosphate, a fluoro-phosphate (phosphate fluoride), or another material that comprises atoms of metals or semimetals. In some designs, it may be advantageous (e.g., for stability) that the protective surface layer does not exhibit conversion reactions during the battery cycling. In some designs, the protective surface layer material may comprise one or more of the following elements: transition, alkali or alkaline-earth metal (such as iron (Fe), manganese (Mn), copper (Cu), yitrium (Y), zirconium (Zr), niobium (Nb), molybdenum (Mo), chromium (Cr), lithium (Li), sodium (Na), magnesium (Mg), potassium (K), calcium (Ca), strontium (Sr), cesium (Cs), barium (Ba), among others), lanthanum or lanthanoids (La, Ce, Gd, Nd, Eu, etc.), beryllium (Be), aluminum (Al), silicon (Si), gallium (Ga), germanium (Ge), phosphorous (P), arsenic (As), tin (Sn), bismuth (Bi), lead (Pb), indium (In), cadmium (Cd), zinc (Zn), fluorine (F), iodine (I), oxygen (O), nitrogen (N), sulfur(S), selenium (Se), tellurium (Te), hydrogen (H) and carbon (C).

In some designs (e.g., to maximize electrode uniformity, battery stability and performance, achieve acceptable rate performance, etc.), it may be advantageous for such biomass-derived carbon comprising composite electrode particles to exhibit average characteristics dimensions (e.g., diameter) in the range from around 5 nanometers (nm) to around 150 microns. In some applications, too small of an average particle size may generally lead to difficulties achieving high packing density. At the same time, in some designs, smaller participates may also result in small interparticle pore size, which may slow down rate performance in the electrode and lead to faster cell degradation (particularly, if batteries are operating at faster rates or at lower temperatures). In some designs, too large of an average particle size, on the other hand, may lead to local variations in the electrode capacity loading and result in faster cell degradation (particularly if the battery is operating at lower temperatures or at faster rates). The composite particle size, the interconnectivity of the pores in the composite as well as the ionic and electronic transport within the composite materials may affect the particle-level rate performance in some applications. In some designs, too large of an average particle size may also result in poor (or insufficiently good for a given application) charge or discharge rate performance. While various electrode and electrolyte properties, battery cell operational conditions (current, rate, temperature, charge voltage, electrode operating potential, etc.), porosity and shape of the composite particles and other parameters affect optimal composite particle size, it may be advantageous in some applications for such composite electrode particles to exhibit average characteristics dimensions (e.g., an average size) in the range from around 200 nm to around 20 microns (in some designs—from around 600 nm to around 10 microns, in some designs—from around 600 nm to around 20 microns). In some designs, a suitable electrode-level porosity (e.g., the volume fraction of the space in the electrode at least partially filled by the electrolyte) may be affected by the volume fraction of the binder, volume fraction of conductive and other additive and volume fraction of active (composite) particles, electrolyte conductivity, electrode thickness, battery operation, volume expansion upon lithiation and other properties. However, in some designs, values ranging from around 7 vol. % to around 70 vol. % are acceptable. In some designs, a smaller volume fraction may lead to slow charging or discharging rates and faster cell degradation. In some designs, a larger volume fraction may undesirably reduce volumetric energy density, rate performance and increase battery costs. In some designs, the volume fraction of the electrode occupied (filled) with a suitable electrolyte may advantageously range from around 7 vol. % to around 35 vol. %. In some designs, the suitable volume fraction of the electrode occupied (filled) with a suitable electrolyte may even be in narrower range, from around 15 vol. % to around 30 vol. %.

In some designs, it may be advantageous for the composites comprising such conversion-type (or alloying-type) active materials and biomass-derived carbon to have a meaningful weight fraction of active materials, such as preferably from around 20 wt. % to around 95 wt. % (in some designs, from around 30 wt. % to around 87 wt. %). In some designs, the weight ratio of such active material to biomass-derived carbon may preferably range from around 1:4 to around 20:1 (in some designs, from around 1:3 to around 7:1). Too low fraction of active materials may lead to undesirably low volumetric capacity in some designs, while too high fraction of active materials may lead to reduced electrode stability and excessive volume changes.

In some designs, it may be advantageous to produce two types of pores (to be at least partially filled with electrolyte for the cell assembling and battery operation) in the composite electrodes: (i) "regular" type pores between the particles (as in "regular" battery or supercapacitor electrodes); (ii) additional "channel" pores that are larger on average than "regular" pores and propagate from the surface of the electrode towards the current collector surface. In an example, such "channel" pores may partially accommodate volume changes during cycling and improve electrode stability as well as reduce stresses at the current collector-electrode interface and its mechanical stability. Furthermore, in some applications, such channels may allow more uniform lithiation of the bulk of the electrode (particularly at moderate and fast rates, such as C/3 to 4C, defined as charging and discharging within 3 hours to ¼ hours, respectively), which may further improve cycle stability. In some designs, it may be advantageous for these "channel" pores to be straight (e.g., to reduce tortuosity for ion motion from the surface to the bulk and the bottom of the electrode). In some designs, it may be further advantageous for these "channel" pores to propagate to more than about 25% of the electrode width (in some designs—more than about 50%, including all the way through the electrode reaching current collector; e.g., to improve cell properties meaningfully). In some designs, it may be advantageous for these "channel" pores to be regularly spaced (e.g., in a hexagonal or square or orthorhombic or rectangular patterns) (e.g., to achieve the smallest maximum distance from all the particles in the electrode to the surface of the "channel" pores per given number of the channel pores within a unit area of the electrode). In some designs, regular spacing of the "channel" pores may become particularly important for medium thickness (e.g., about 25-75 micron/one coating side) and even more so for larger thickness (e.g., about 75-200 micron/one coating side) of the composite-comprising electrodes, which may exhibit the largest stresses and the fastest degradation. While the composite particle design, the presence of carbon as well as the presence of pores within the composite particles may contribute to reduced volume changes in the electrodes and the corresponding stresses, the presence of "channel" pores may still be highly advantageous in some designs. In some designs, it may be advantageous for the average width (in case of slit-shaped pores) or average diameter (in case of cylindrical or pyramid shaped pores) of the "channel" pores to range from about 3 micron to about 600 micron (e.g., more preferably from around 10 micron to about 200 micron). In some designs, smaller than 3 micron channel pores within the electrode may not provide sufficient advantages and could be expensive or challenging to produce. In some designs, larger than 600 micron pores may reduce energy density, lead to local mismatch of the capacity on the anode and cathode (and thus may reduce stability or cell energy) and, in some designs, may even be challenging to produce. In some designs, it may be advantageous for the average spacing between the "channel" pores in the electrode to range from about 10 microns to about 10,000 microns (e.g., more preferably from around 50 microns to about 1000 microns). In some designs, smaller than 10 micron spacing may be more challenging to produce and, importantly, may lead to reduction in the volumetric energy density of the device. In some designs, larger than 10,000 micron spacing may provide too limited advantages. The shape of the "channel" pores may vary between applications or in a particular application (e.g., different "channel" pore shapes in a particular particle). In some illustrative examples, the shape of the "channel" pores within the electrode may be columnar/cylindrical, slit-like (or crack-like), "V" shaped, caterpillar-like, among many others, or any combination thereof. In some designs, the "channel" pores within the electrode may exhibit multiple branches (e.g., be dendritic) to further enhance uniformity of lithiation and minimize stresses. In some designs, the volume fraction of the "channel" pores may range from around 0.01 vol. % to around 30 vol. % (as a volume fraction of the electrode). In some designs, a larger volume fraction of the "channel" pores may lead to undesirably significant reduction in the volumetric energy characteristics of the cell. In addition, in some cases, a larger volume fraction of the "channel" pores may reduce mechanical properties of the electrode and contribute to premature failure. In some designs, formation of the "channel" pores may be induced by mechanical component (e.g., by using an array of indenters), by using sacrificial templates, by forming "cracks" during electrode drying, by using laser micro-machining and other mechanism. In an example, the "channel" pores in the electrode may be induced before or after electrode calendaring (densification). In some designs, it may be advantageous to induce pores after partial calendaring (densification) but before the final calendaring (densification) to achieve a favorable combination of suitable electrode mechanical properties, densities and pore size while using a more favorable (e.g., more reliable or inexpensive or fast) "channel" pore formation process. In some designs, it may be advantageous to heat the electrodes during or after the introduction of the "channel" pores into the electrodes (but before filling the electrode with the electrolyte). In some applications, heating may reduce some of the induced stresses or favorably change mechanical properties of the electrode. In an example, the suitable temperature may vary and may depend on multiple factors (e.g., the type and thermal properties of a binder used (if any), thermal stability of the current collector, thermal stability of the electrode, thermal stability of the conductive or other additives, electrode thickness, etc.). However, for some designs, the heating temperature may range from around 40° C. to around 200° C. (although in some special designs higher temperatures may also be used—e.g., up to around 600° C.).

In some designs (e.g., to maximize cell stability), it may be advantageous for such biomass-derived carbon comprising composite electrode to exhibit changes in the composition from the surface of the electrode towards the current collector. In one illustrative example, it may be advantageous for the top about 20-50% of the electrode to exhibit meaningfully higher (e.g., about 10% to about 300% higher) porosity (to be at least partially filled with electrolyte) than the bottom about 50-80% of the electrode (e.g., to optimize rate performance). In another illustrative example, it may be advantageous for the top about 20-50% of the electrode to comprise meaningfully smaller (e.g., from about 20% smaller to about 30 times smaller) average size of the composite particles than the bottom about 50-80% (e.g., to optimize rate performance and stability). In yet another illustrative example, it may be advantageous for the bottom about 20-50% of the electrode to comprise meaningfully more conductive additives (e.g., about 10% to about 5 times larger mass fraction of the conductive additives) than the top about 50-80% (e.g., to optimize rate performance and stability). In yet another illustrative example, it may be advantageous for the bottom about 10-50% of the electrode to comprise meaningfully higher binder content (e.g., about 10% to about 5 times larger mass fraction or volume fraction of the binder per unit electrode mass or volume) than the top about 50-90% (e.g., to optimize rate performance and stability). In some designs (e.g., to maximize rate performance or battery stability), it may be advantageous for such biomass-derived carbon comprising composite electrode to contain a conductive interlayer between the current collectors (e.g., metal foils or porous metal foils or metal mesh or other suitable types of current collectors) and the electrode coating (e.g., comprising composite particles, conductive additives and a binder). In some designs, such a conductive interlayer may enhance adhesion and mechanical stability of the electrode, which is particularly important for certain conversion-type electrodes due to substantial volume changes in conversion-type (incl. alloying type and metal-type) active materials. In addition, in some designs, such an interlayer may allow one to reduce the fraction of the binder in the bulk of the electrode (e.g., for faster ion transport). In an example, the thickness of such an interlayer may range from around 0.005 micron to around 5 microns (e.g., from around 0.05 micron to around 0.5 micron). In an example, a larger interlayer thickness may reduce energy density and lead to higher first cycle losses. However, in some applications, too small of an interlayer thickness (e.g., below about 0.005 micron) may be less effective in improving adhesion to the current collector and in reducing interfacial resistance. In an example, the interlayer may comprise conductive additives (such as carbon nanotubes (either single walled or double walled or multiwalled) or carbon fibers or carbon nanofibers or carbon black or exfoliated graphite or graphene or other types of conductive carbon, metal nanowires, carbon or metal-coated fibers or nanofibers, conductive polymer, etc.) or mixtures of several distinctly different conductive additives and a binder (e.g., a polymer binder or carbonized/graphitized polymer binder). In some designs, the interlayer may be deposited by spray-coating process or by casting or by electrophoretic deposition or by dip coating or by other technique of deposition from a slurry suspension. In some designs, it may be advantageous for the interlayer to be grown or deposited on the surface of the current collector (e.g., by vapor deposition technique such as chemical vapor deposition (CVD) or physical vapor deposition (PVD) including sputtering or by a solution growth method, by electrodeposition, etc.). In some designs, the porosity within the interlayer (e.g., at least partially filled with an electrolyte prior to battery use) may range from as little as about 0% to as high as about 99%. In some designs, the interlayer may be designed to intentionally separate from the current collector (e.g., upon excessive heat—e.g., above certain temperatures such as around 80-150° C. in one illustrative example) as a safety feature (e.g., to prevent a thermal runaway in a battery cell). This could be achieved, for example, by using a polymer that shrinks and/or loses adhesion to the current collector above a certain temperature. Alternatively, as another illustrative example, the interlayer may become insulative above a certain temperature (e.g., due to a phase transformation). Examples of suitable compositions may include various conductive polymer composites with pyroresistive behaviors.

In some designs, thus produced biomass-derived carbon/conversion-type active material composite particles may be further (at least partially) enclosed in a functional shelling layer (e.g., to prevent undesirable interactions between electrolyte and active material or for other advantageous purposes). In some designs, the volume fraction of the functional shelling layer may range from around 0.001 vol. % to around 20 vol. % of the volume of the composite particles. In some designs, the functional shelling material layer may also act as "active" material in terms of its ion storage capability (e.g., exhibit capacity in the range from around 0.1% to around 75% of that of the active material when expressed in the units of capacity per unit mass, mAh/g, or capacity per unit volume, mAh/cc). In some designs, such a shelling material layer may be deposited by using vapor deposition techniques (such as CVD, ALD, among others), electrochemical deposition, electrodeposition, electroless deposition, electrophoretic deposition, layer-by-layer deposition or various other solution-based deposition techniques or combination of both solution and vapor depositions. In some designs, after the shelling material deposition, the composite may be heat-treated (e.g., at temperatures from around 100 to around 1000° C.) in a suitable gaseous environment or vacuum to enhance composite properties. In some designs, the average thickness of the shelling material layer may vary, depending on the particle size, ionic and electrical conductivity of such a layer and other properties. In some designs, the suitable thickness may range from around 0.2 nm to around 200 nm, although a larger thickness may also be acceptable in some applications (although sometimes at the expense of reduced volumetric capacity of the electrodes or reduced electrode porosity). In some designs, the shelling material layer may comprise carbon (C) (e.g., in some designs, mostly conductive $sp^2$-bonded carbon, as in graphite or graphitic carbon or turbostratic carbons or most amorphous carbons). In some designs, various carbon atoms comprising solvents or various hydrocarbon (e.g., $C_5H_{12}$, $C_5H_{10}$, $C_5H_8$, $C_6H_6$, etc.) vapors may be used as precursors for carbon deposition. In some designs, hydrocarbon gases (e.g., $CH_4$, $C_2H_2$, $C_2H_4$, $C_2H_6$, $C_3H_6$, $C_3H_5$, $C_3H_4$, $C_4H_{10}$, $C_4H_8$, $C_4H_6$, etc.) or their combinations may advantageously be used as precursors for carbon deposition. In some designs, viscoelastic polymers (including bio-derived ones, such as pitch) may be used as precursors for carbon layer formation. In some designs, the pitch may be derived from petroleum, coal tar, plants (including wood). In some designs, the shelling material layer may be a composite of two more materials. In some designs, the shelling material may comprise flake-shaped particles. In some designs, the shelling material may comprise one or more of the following elements: transition, alkali or alkaline-earth metal (such as iron (Fe), manganese (Mn), copper (Cu), yttrium (Y), zirconium (Zr), niobium (Nb), molybdenum (Mo), chromium (Cr), lithium (Li), sodium (Na), magnesium (Mg), potassium (K), calcium (Ca), strontium (Sr), cesium (Cs), barium (Ba), among others), lanthanum or lanthanoids (La, Ce, Gd, Nd, Eu, etc.), beryllium (Be), aluminum (Al), silicon (Si), gallium (Ga), germanium (Ge), phosphorous (P), arsenic (As), tin (Sn), bismuth (Bi), lead (Pb), indium (In), cadmium (Cd), zinc (Zn), fluorine (F), iodine (I), oxygen (O), nitrogen (N), sulfur(S), selenium (Se), tellurium (Te), hydrogen (H) and carbon (C). In some designs, the shelling material layer may comprise a polymer. In some designs, a polymer may exhibit high electrical and/or ionic conductivity (e.g., in the range from around $10^{-7}$ to around $10^{+4}$ S/cm). In some designs, a polymer layer may be at least partially carbonized. In some designs, the shelling material layer may comprise a glass or ceramic layer. In some designs, a glass or ceramic layer may exhibit high electrical and/or ionic conductivity (e.g., in the range from around $10^{-7}$ to around $10^{+4}$ S/cm). In some designs, the shelling material layer may comprise a metal or metal alloy.

It some designs, it may be advantageous for the shelling material not to exhibit conversion reaction during repeated charge-discharge cycling of the electrode.

In some designs, biomass-derived carbon comprising composite particles may be produced by first producing porous biomass-derived carbon and then infiltrating the pores with conversion-type (or alloying-type) active materials. Such an infiltration process may be conducted by using vapor deposition techniques (such as CVD, atomic layer deposition (ALD), among others) or solution infiltration techniques (including a sol-gel or hydrothermal synthesis or layer-by-layer deposition or electrodeposition or electroless deposition or electrophoretic deposition or salt infiltration followed by solvent evaporation, among others) or melt-infiltration (e.g., infiltrating a precursor or a component of a precursor from a melt) or various combination(s) of more than one of such techniques (e.g., an infiltration of a precursor salt(s) from solution or vapor phases or melt followed by annealing or heat-treatment in controlled gaseous environment-reducing (e.g., in $H_2$ or hydrogen-containing gases such as hydrocarbon gases or vapors, among others) or oxidizing (e.g., in O or F or Cl or S containing gases, among others) or neutral (e.g., as $N_2$ or Ar or He gases or vacuum), where the gaseous environment may comprise molecules comprising fluorine or hydrogen or oxygen or sulfur or phosphorous or lithium atoms, etc.). As such, in some designs, precursors may first be infiltrated and then converted to suitable conversion-type active materials by, for example, heat-treatment under a suitable gaseous (or vaporous) environment. In some designs, as previously mentioned, additional shelling material layer may at least partially enclose (or coat) active materials, carbon or the whole composite particles. The maximum heat-treatment (e.g., in a controlled environment) temperature of such processes during the composite formation may vary depending on composite properties and composition of the intercalation-type active material (e.g., its thermal stability, mobility, reactivity in contact with carbon, etc.), but as an example may be in a range from around 80° C. to around 1,000° C. (e.g., from around 200 to around 700° C.). In some designs, more than one heat-treatment in different gaseous environments (e.g., initially in O- or F-containing or S-containing or P-containing or N-element containing gas compositions and then in Ar or $N_2$) at different temperatures (e.g., from around 50° C. to around 1,000° C.) or pressures (e.g., from around 0.0001 Torr to 20,000 Torr; in some designs—near atmospheric pressure) and/or for different time durations (e.g., from around 0.0001 sec to around 240 hours) may be implemented so as to tune the optimal material synthesis (e.g., for the formation of composites with the desired active particle size residing primarily within the carbon pores and with the desired phase and stoichiometry of active material particles, etc.).

The biomass in the described above biomass-derived carbon comprising composite particles may come from a very broad range of sources. Furthermore, the properties of such biomass-derived carbon may vary broadly between applications. However, certain specific types of the biomass and certain ways of converting the biomass into carbon and certain properties of the biomass-derived carbon may be particularly attractive for particular battery types (such as Li-ion batteries and others) and/or other types of electrochemical energy storage applications.

In some designs, renewable biomass-derived carbon from the following precursors were found to be particularly attractive for biomass-derived carbon-comprising composite particles based on intercalation-type active particles: (i) nut shells, particularly coconut shells, apricot shells, almond shells, among others; (ii) wood, including waste wood products; (iii) natural carbohydrates (including saccharides and saccharide-comprising natural compounds), such as cellulose, chitin, alginate, sucrose and glucose, gum arabic, and starch, among others.

In some designs, it may be advantageous for the biomass-derived porous carbon particles to exhibit so-called BET specific surface area (SSA) (as measured by $CO_2$, $N_2$, $H_2$ or Ar gas sorption) in the range from about 500 $m^2/g$ to about 4,400 $m^2/g$ (prior to forming composites). In some designs, the suitable BET SSA may range from about 800 $m^2/g$ to about 3,000 $m^2/g$. BET SSA larger than 4,400 $m^2/g$ may make it difficult to produce composites with sufficiently high mechanical stability to accommodate volume changes in conversion materials. BET SSA smaller than 500 $m^2/g$ may undesirably limit volumetric capacity (or capacitance) or other important properties of the composites in some electrochemical energy storage applications.

In some designs, it may be advantageous for the biomass-derived porous carbon particles to exhibit open porosity (e.g., void space) in the range from about 30 vol. % to about 89 vol. % and the total open pore volume in the range from about 0.2 $cm^3/g$ to about 3.7 $cm^3/g$, as determined by gas sorption (e.g., $CO_2$, $N_2$, $H_2$, Ar, etc.) or other suitable measurements. In some designs, the suitable pore volume may range from about 0.6 $cm^3/g$ to about 3.0 $cm^3/g$ (in some designs—from about 0.75 $cm^3/g$ to about 2.5 $cm^3/g$). In some designs, a pore volume larger than 3.7 $cm^3/g$ may make composites insufficiently robust to undergo volume changes without formation of undesirable defects and cracks. In some designs, a pore volume smaller than 0.2 $cm^3/g$ may undesirably limit volumetric capacity of the composites (and thus volumetric energy density of the cells) and thus limit its usefulness in the above-described applications.

In some designs, it may be advantageous for the biomass-derived porous carbon to exhibit compositional purity of more than about 90 wt. % (e.g., less than about 10 wt. % non-carbon species) prior to forming composites, as determined by chemical composition, energy dispersive spectroscopy (EDS) and thermo-gravimetric analysis (TGA). In some designs, purity of more than about 96 wt. % is further advantageous. In some designs, the so-called "ash" content is less about 10 wt. % (e.g., preferably less than about 4 wt. %, more preferably less than about 2 wt. %, even more preferably less than about 1 wt. %, and even more preferably less than about 0.25 wt. %). In some applications, higher content of various impurities (K, S, Ca, Na, Zn, P, O, etc.) may induce side reactions, significantly reduce cycle stability (particularly at elevated temperatures), induce premature failure, reduce gravimetric and volumetric energy storage characteristics, reduce power density, lead to undesirably larger cell-to-cell or batch-to-batch variations and/or possibly induce some sort of other undesirable outcomes that reduce performance characteristics of electrochemical cells (e.g., Li or Li-ion batteries). To attain high purity biomass-derived porous carbon, it may be advantageous to use a combination of chemical and thermal purification stages in some designs.

In some designs, it may be important for the biomass-derived porous carbon to comprise less than about 10 wt. % (e.g., preferably less than about 2 wt. %, more preferably less than about 0.5 wt. %) of hydrogen atoms (e.g., present within its structure or as part of the functional groups). In some designs, higher hydrogen content may lead to the undesirable formation of gases and cell swelling, reduced capacity utilization, reduced cycle stability, higher first cycle losses and/or other undesirable reductions in performance characteristics. In an example, the hydrogen content may be determined by using a hydrogen analyzer, titration, nuclear reaction analysis (NRA), Devanathan-Stachurski method, scanning Kelvin probe force microscopy (SKPFM) or other suitable characterization mechanism.

In some designs, it may be advantageous to use so-called physical activation techniques (such as activation in a stream of $CO_2$ or $H_2O$ or both, among others) to induce additional pores and increase pore volume and surface area of bio-derived carbons. Suitable activation temperature may vary depending on the types of the carbons and pre-treatment history. However, as an example, suitable temperatures may be in the range from around 700° C. to around 1300° C. (in some designs—from around 800 to around 1150° C.). In an example, temperatures higher than about 1300° C. may make the activation process very difficult to control to a desired uniformity and may additionally induce undesirable pore size distribution within carbon. In another example, temperatures lower than about 700° C. may make the activation process too slow and may not achieve the desired pore size and surface area characteristics in the produced activated bio-derived carbon. In some designs, formation of so-called hydrochars (carbons produced by hydrothermal treatment of the hydrocarbon precursors, including various biomaterials, such as shells, wood wastes, etc.) may be advantageous prior to activation. In some designs, biomaterial precursors may be annealed in an inert environment (e.g., in vacuum or in $N_2$ or Ar or He gas, etc.) prior to activation. In some designs, suitable temperatures may range from about 500° C. to about 2800° C., depending on the precursor and the desired porosity after activation. In some designs, heat-treatment at temperatures lower than about 500° C. may have too little impact on activation and may not remove (sometimes desired) amount of impurities (e.g., as effluent(s)). In some designs, heat-treatment at temperatures higher than about 2800° C. is very effective in obtaining high-purity material, but may prevent one from achieving high BET SSA and forming (sometimes desirable) small pores after activation. In some designs, chemical activation may be used instead or in addition to physical activation. Examples of suitable chemical activation agents include, but are not limited to, KOH, NaOH, $ZnCl_2$, $H_3PO_4$, $K_2CO_3$, or $H_2SO_4$. In some designs, the carbonization stage proceeds concurrently with the chemical activation. In other designs, after carbonizing the bio-derived precursor, the obtained carbon may then be mixed with chemical activation agent, heat-treated for activation and then purified.

In some designs (e.g., to maximize rate performance or battery stability), it may be advantageous for such biomass-derived carbon (used in the composite electrodes) to be heat-treated (annealed in a controlled environment) after activation (and optional purification) process. The annealing process may provide additional purification, may enhance electrical conductivity of carbon, may enhance mechanical properties of carbon, may reduce the number of nucleation cites (for deposition of active materials) and may lead to reduced self-discharge and other performance benefits in cells (e.g., better rate, better stability, etc.). In some designs, a suitable temperature may range from about 400° C. to about 2400° C., depending on the precursor, gas composition and pressure, porosity and microstructure of the activated carbon particles, desired purity and the desired porosity after activation. In some designs, higher temperatures may generally result in fewer nucleation cites and higher purity. However, too high temperatures may undesirably reduce BET SSA and pore volume, close some of the pores, make material too hydrophobic (e.g., if annealing is conducted in an inert environment or vacuum) and/or induce other shortcomings. In some designs, annealing may advantageously be done both before and after activation of carbon.

In some designs, it may be advantageous to mix (e.g., milled) bio-derived carbon (including, but not limited to exfoliated carbon) with bio-polymers (such as starch, sugars, cellulose and cellulose-derived products, alginate and alginate-derived products, plant-derived pitch, among others) and active material (nano) particles or precursor (e.g., salts) and carbonize to obtained biomass-derived carbon-containing composites. In some designs, such mixtures may comprise just bio-polymers and active material (or active material precursor) (without bio-derived carbon particles). In some designs, it may be advantageous to utilize a spray-drying technique or a spray pyrolysis technique as at least one of the stages in composite synthesis. In some designs, it may be advantageous to utilize hydrothermal (or solvothermal) treatment during at least one of the stages in composite synthesis (e.g., to induce oxidation or crystallization of the precursor at relatively low temperatures without burning/over-oxidizing carbon, etc.). In some designs, it may be advantageous to utilize hydrothermal in combination with heat-treatment in controlled environment (e.g., reactive such as oxygen-containing or fluorine-containing or sulfur-containing environment at low temperatures (e.g., below around 350-400° C.) or inert at higher temperatures (e.g., from around 400° C. to around 600-1200° C., depending on the particular chemistry and the resistance of carbon to react with or reduce active material) or both). In some designs, it may be advantageous to utilize a spray-drying technique or a spray pyrolysis method as at least one of the stages in composite synthesis. In some designs, polymers or carbon produced not from a renewable biomass but from nonrenewable hydrocarbons (e.g., petroleum pitch, coal tar, etc.) may be effectively used as well. Temperature of the pyrolysis or the subsequent (to spraying) heat treatment may vary depending on the active material composition, but as an example may range from around 300° C. to around 1200° C. (in some designs, from around 450° C. to around 1000° C.). In some designs, higher temperatures may lead to the undesirable reaction of active material or active material with carbon forming carbides and other undesirable compositions. In some designs, lower temperature may limit rate performance and capacity of the produced composites.

In some designs, it may be advantageous for the electrodes comprising conversion-type (including alloying-type or metal-type) active materials to additionally comprise polymer electrolytes. In some designs, such electrolytes may reduce or prevent undesirable side reactions between active materials and electrolyte (e.g., electrode dissolution) that may degrade cell performance in liquid electrolytes. The use of carbon in such composites may be advantageous in terms of reduction of volume changes, which may be much more difficult to accommodate compared to electrodes with liquid electrolytes. In some designs, cells with conversion-type active material comprising composite electrodes may be solely based on solid electrolytes (e.g., polymer electrolytes or ceramic electrolytes) that do not comprise any liquid solvent.

In some designs, it may be advantageous for the electrodes comprising conversion-type (including alloying-type or metal-type) active materials or intercalation-type or pseudocapacitive-type active materials to be prepared in certain ways or to comprise certain binders or certain conductive or other additives.

For example, in some designs, when water is used as a slurry solvent (or a slurry co-solvent) for at least one of the mixing stages of the carbon-containing electrodes, it may be advantageous to deviate from a neutral pH. In one example, pH adjustment may be advantageous to induce a positive or a negative charge on the surface of active (nano) composite electrode particles or other particles in a slurry in order to achieve more uniform dispersion. In another example, pH adjustment may be advantageously used in order to induce controlled adsorption of at least one of the binder component (s) on the surface of active (nano) composite electrode particles. Depending on the composition and surface chemistry of the particles in a slurry as well as the binder composition, the optimal pH values may range from around 3 to around 12 in some designs. In some applications, extreme pH values (e.g., less than 3 or greater than 12; depending on the composition of the slurry) may induce undesirable damage to the particles or the binder or another co-solvent (if present).

In some designs, it may be advantageous to use one dimensional (1D) conductive additives (such as single-walled carbon nanotubes, double-walled carbon nanotubes, multiwall carbon nanotubes, carbon (nano) fibers, compatible metal nanofibers, nanotubes and nanowires (e.g., copper, nickel, titanium, iron nanowires/nanofibers, aluminum nanowires/nanofibers, nickel nanowires/nanofibers, etc.)) in electrodes comprising the carbon containing (nano) composite electrode materials. In some designs, if metal nanowires or nanofibers are used as conductive additives, it may be advantageous for some of them (e.g., Cu, Ni, Ti, or others) to be coated with a thin (e.g., about 0.2-10 nm) layer of conductive carbon or polymer (with optional functional groups on its surface) or other functional surface layer to (i) prevent their corrosion during the slurry preparation or handling or (ii) improve dispersion in a slurry or (iii) improve their adhesion in an electrode.

In some designs, the surface of the (nano) composite particles may comprise carbon. In the context of one or more embodiments of the present disclosure, the addition of chemical moieties to carbon, or functionalization, of the carbon (or carbon containing) surfaces of the electrode particles of interest may provide many advantages. In one example, changes in the carbon surface chemistry may provide improved dispersibility during electrode slurry preparation. Furthermore, in another example, changes in the surface chemistry may lead to favorable changes in the interfacial interactions with active particles, conductive additives, binders, electrolyte, and/or SEI. In a further example, functionalization of carbon may introduce a handle for the formation of strong covalent bonds between various carbon-containing materials (active electrode particles that comprise carbon on their surface or conductive additives) and (in some cases) between carbon-containing materials and a binder. In some cases, even when the surfaces of the electrode particles do not comprise carbon, similar functional groups (or small molecular chains or small dendritic structures, e.g., with less than about 80 atoms, chemically attached to the electrode particle surface) may also be advantageous.

In some designs, introduction of polar groups to the (carbon) surface may provide improved dispersibility in polar solvents such water, N-methylpyrrolidinone, N,N-dimethylformamide, alcohols, which allows for more uniform slurry mixtures and thus a more uniform electrode. In some designs, introduction of non-polar groups, such as alkyl chains, may provide improved dispersion in non-polar solvents such as aliphatic hydrocarbons.

In some designs, it may be advantageous to attach conductive additives to the (nano) composite electrode particles by other mechanisms. In one example, conductive additives (e.g., carbon nanotubes or graphene or metal nanoparticles or metal nanowires) may be directly on the surface of the electrode particles (e.g., by CVD or by solution chemistry routes). In another example, the conductive particles (of various shapes and sizes) may be strongly attached to the surface of the electrode particles by making the surface of each (or most) particle(s) charged and by using the opposite charge on the electrode particles vs. conductive additive particles. In yet another example, the conductive particles may be attached to the surface of the electrode particles using an organic (e.g., a polymer) binder and by carbonizing the binder forming a conductive carbon interlayer (e.g., which effectively acts as a conductive glue) between the conductive additive(s) and the electrode particle(s). In yet another example, one may CVD deposit a carbon layer on the mixture of conductive additive particles and active electrode particles, thereby preferentially depositing carbon at the contact points between the electrode particles and conductive additives. In an example, the CVD carbon layer may similarly act as a conductive glue to strongly attach conductive additive(s) to the electrode particle(s).

In some designs, the optimal wt. % of slurry components, given as a ratio of the mass of non-active components to the external surface area of (nano) composite active electrode particles, may exhibit values ranging from about 1 to about 5,000 $m^2$ active/g non-actives (e.g., from around 5 to around 200 $m^2$ active/g non-actives). In some designs, the optimal wt. % of slurry components for a particular electrode composition may depend on the size of the active particles, type of conductive additives, surface chemistry of the conductive additives, surface chemistry of the active particles, density of the particles, volume changes during cycling, type and molecular weight of the binder(s), thickness of the electrode, density of the electrode and/or other parameters.

In some applications, it may be advantageous to induce an opposite charge on the surface of conductive additives and the (composite) electrode particles in order to enhance their contact area and contact strength and achieve more uniform mixing. For example, a positive charge may be introduced on the surface of the composite particles and a negative charge may be introduced on the surface of conductive additives. In another example, a negative charge may be introduced on the surface of the composite particles and a positive charge may be introduced on the surface of conductive additives. In some applications, it may be advantageous to induce a chemical reaction between conductive additives and the electrode particles during or after electrode drying.

In some designs, it may be advantageous to use more than one type of conductive additive (e.g., having different dimensions, aspect ratio or morphology) for most optimal performance. In some designs, it may be further advantageous to chemically bond one type of conductive additive to the surface of electrode particles. In this case, as an example, the requirements on the lack of swelling for maintaining stability of the electrode particle/conductive additive interface may be substantially reduced or even completely avoided. In one example, short (e.g., about 0.01-10 micron) carbon nanofibers, carbon nanotubes, or graphene/graphite ribbons may be grown from the surface of electrode particles (e.g., by using catalyst-assisted chemical vapor deposition, CVD, or other mechanisms). In another example, a mixture of conductive carbon additive particles (e.g., carbon black, carbon nanotubes, etc.) with one charge and electrode particles with the opposite charge may be additionally mixed with a small sacrificial binder content and then carbonized. In some designs, the carbonized binder may firmly and permanently attach some of the carbon additives to the surface of the electrode particles. In an example, such electrode particles/carbon additives composites may be used in slurries with various suitable binders and additional conductive additives to form (or cast) more stable electrodes that experience moderate volume changes during cycling (e.g., as applicable in the context of the present disclosure).

In some applications, it may be advantageous to use two or more conductive additives with different surface charges or different surface chemistries. In particular, in some designs, when one type of additive exhibits higher affinity to the electrode particles, such an additive may be selected to form a uniform coating around the electrode particles. In some designs, such an additive may also be selected to form chemical bonds with the electrode particles at some stage of the electrode assembling or slurry preparation. As an example, the second additive may be incorporated into the binder in significantly higher fraction than the first additive and thus be optimized for forming robust and uniform binder/additive (nano) composites that yield stable electrodes.

In some applications, two or more conductive additives may be selected to achieve different functions. In one example, one type of additive (e.g., with larger dimensions or higher conductivity, such as carbon nanofibers, other conductive nanofibers, long (e.g., above about 10 micron in length) carbon nanotubes, graphite or graphene flakes with linear dimensions in excess of about 5-10 micron, other conductive flakes, metal nanowires, etc.) may be selected to provide higher electrical conductivity within the electrode as a whole, while the second type of conductive additive (e.g., carbon black and other conductive nanoparticles, shorter (e.g., about 0.25-10 micron in average length) carbon nanotubes or conductive nanowires or (e.g., chopped) conductive nanofibers, smaller graphene or graphite flakes, shorter graphite ribbons, etc.) may be selected to ensure that each individual electrode particle is effectively electrically connected to multiple neighboring electrode particles and the first type of additive, thereby forming an efficient conductive network that results in high capacity utilization of the electrode material. In another example one type of additive may be selected to perform multiple functions (e.g., to enhance both electrical conductivity and mechanical stability of the electrodes or to enhance electrical conductivity of the electrode and provide faster ionic pathways (e.g., if it is porous or if it prevents electrode pore closing)). In some designs, one type of conductive additive may also assist in better dispersing the second type during the slurry mixing. In particular, in some designs, it may be advantageous to use a mixture of two of the following types of conductive additives in the same slurry: (i) various types of single walled carbon nanotubes (SWCNTs) (with or without surface coatings); (ii) various types of double-walled (DWCNTs), triple-walled (TWCNTs) and other types of multiwalled carbon nanotubes (MWCNTs) (with or without surface coatings); (iii) various types of carbon black (including those that are annealed at above 1000° C. in inert environment); (iv) various types of carbon fibers (including those that are annealed at above 1000° C. in an inert environment); (v) various types of carbon nanofibers; (vi) various types of metal nanowires (without or with protective or functional surface coating layers) (e.g., Cu, Fc, Ti, or Ni nanowires for low potential anodes in Li-ion batteries, such as Si comprising anodes; Al nanowires for cathodes or high voltage anodes in Li-ion batteries, or other nanowires (e.g., Ni or Ti nanowires) for various aqueous batteries, etc.); (vii) various types of carbon-coated or metal- (e.g., Cu, Fe, Ni, Ti or Al, etc.) coated ceramic nanowires or fibers (e.g., $Al_2O_3$ nanowires or fibers); (viii) various types of carbon onions; (ix) various types of graphite ribbons (including metal-coated graphite ribbons); (x) various types of metal (e.g., Cu, Fe, Ni, Ti or Al, etc.) nanoparticles (with or without coatings by a protective or functional surface layer); and (xi) various types of metal (e.g., Cu, Fe, Ni, Ti or Al, etc.) (nano) flakes (with or without coatings by a protective or functional surface layer), to name a few examples. In some designs, the surface chemistry of each type of such additive could be individually optimized for optimum performance in cells.

In some applications, it may be advantageous to restrict the overall volume fraction of all conductive additive particles within the electrode to less than about 5 vol. % (even more preferably below about 2 vol. %). In some designs, by mass, the fraction of all conductive additive particles within the electrode may preferably be less than about 7 wt. % (e.g., even more preferably below about 3 wt. %) if only carbon materials are used as conductive additives and less than about 10 wt. % (e.g., even more preferably below about 5 wt. %) if some of the conductive additives comprise suitable metals. In an example, a higher volume fraction of conductive additives may reduce ionic transport and volumetric capacity of electrodes and may increase the extent of undesirable side reactions. In a further example, a higher gravimetric (mass) fraction of conductive additives may reduce the specific capacity of the electrodes.

Figure 2B:
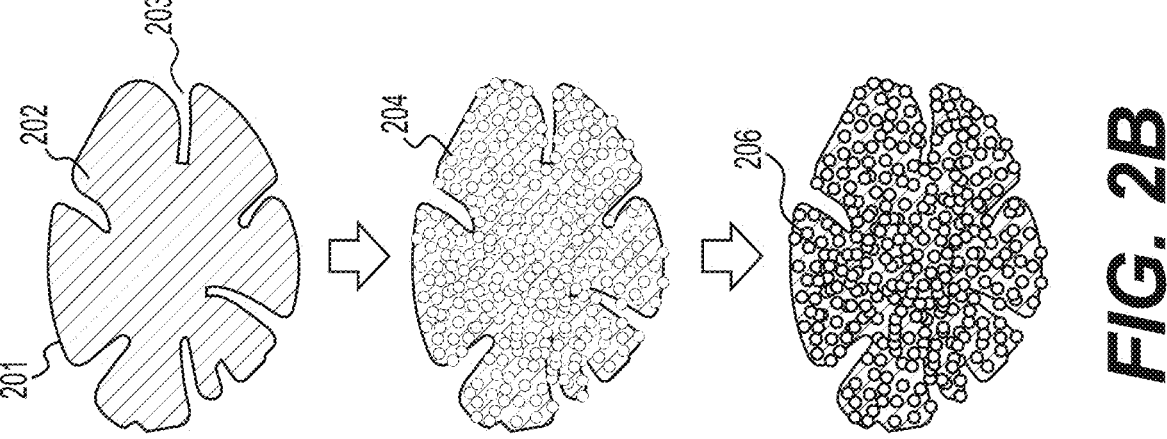
FIG. 2A-2B illustrate two example processes for the formation of biomass-derived carbon-containing composite particles according to various example embodiments.
Figure 2A:
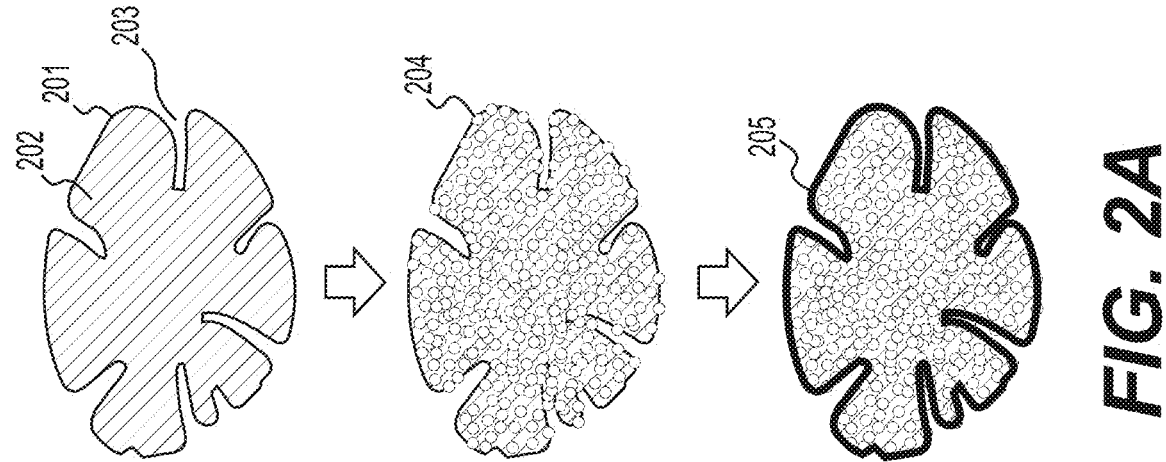

FIG. 2A-2B illustrate two example processes for the formation of biomass-derived carbon-containing composite particles. According to these illustrative embodiments, porous biomass-derived carbon particles 201 having smaller (e.g., about 0.3-20 nm) pores 202 and larger (e.g., about 20-200 nm) pores 203 are infiltrated with suitable active material 204 (e.g., in the form of nanoparticles 204) (e.g., by vapor-deposition mechanism or wet chemistry which may also involve various thermal or hydrothermal treatments and their combinations), reducing the volume fraction of the small pores 202 (and larger pores 203, in some design). According to the FIG. 2A example, the composite particles 201 are at least partially encased in a shell 205 of suitable thickness and composition (as described in this disclosure) that may prevent access of the electrolyte into the small pores 202 (e.g., internal pores or encased pores) and largely prevents a direct contact between active material 204 and electrolyte when these composite particles are processed into a battery electrode (such as an electrode for Li metal or Li-ion or Na metal or Na-ion battery or an electrode for another energy storage device). According to the FIG. 2B example, the active material nanoparticles 201 are coated with a protective surface coating 206. A substantial (e.g., about 20-100 vol. %) portion of the remaining pores 202 in FIG. 2B may remain open and, in some designs, accessible to electrolyte when these composite particles are processed into a battery electrode (or an electrode for another energy storage device, such as a supercapacitor or a hybrid device, etc.).

Figure 3:
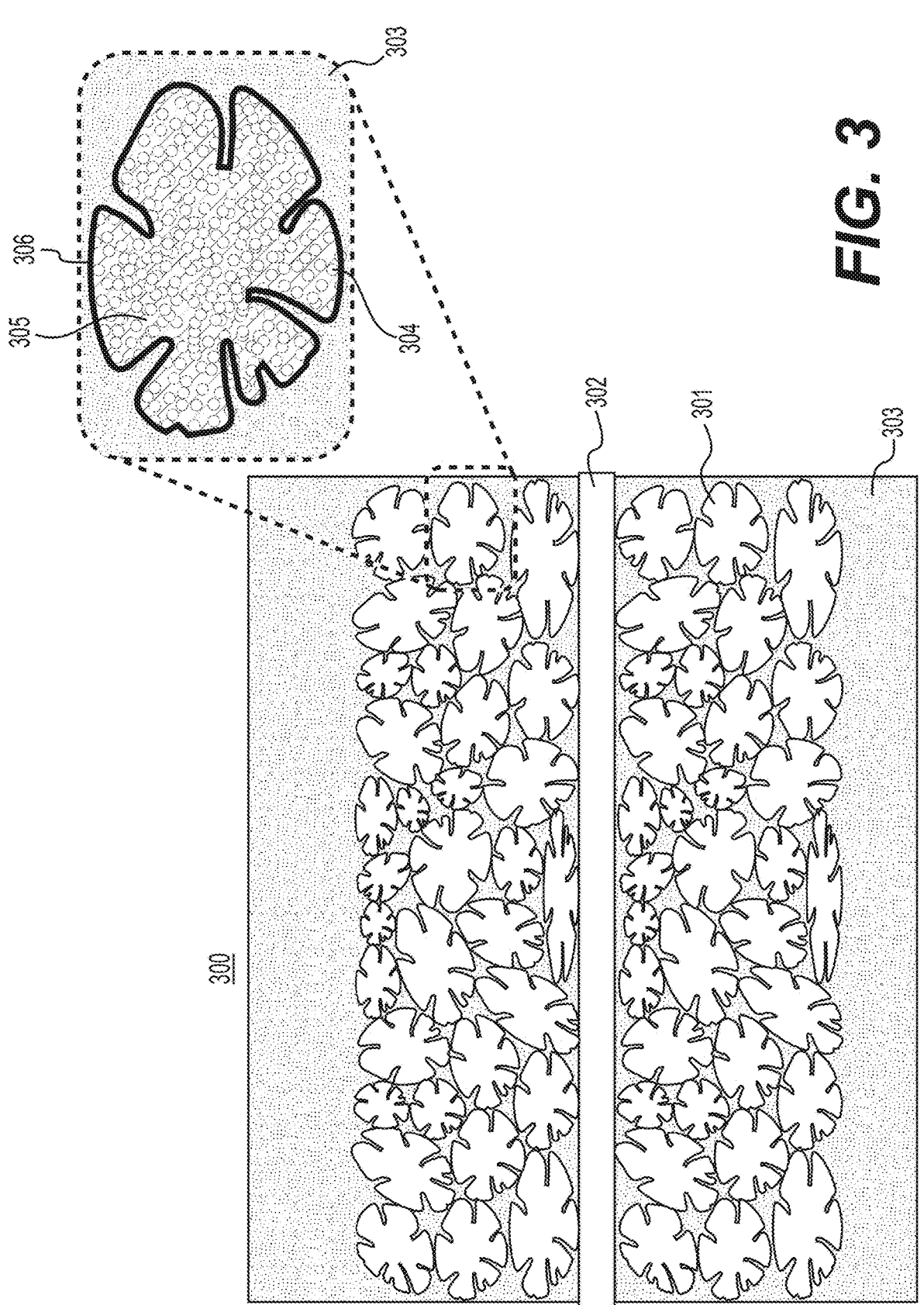
FIG. 3 illustrates an example of an electrode produced with biomass-derived carbon-containing composite particles casted or deposited onto a current collector and filled with an electrolyte according to various example embodiments.

FIG. 3 illustrates an example of an electrode 300 produced with biomass-derived carbon-containing composite particles 301 casted or deposited onto a current collector 302 and filled with an electrolyte 303. In this example, the biomass-derived carbon-containing composite particles 301 comprise small (e.g., less than about 20 nm) pores 305 at least partially (e.g., by about 30-100%) filled with active material 304 (e.g., in the form of nanoparticles) and the whole composite particle (or multiple particles) 301 are coated with a shell 306, that at least partially seals the active material 304 and remaining small pores 305. In some designs, the shell 306 may be pre-deposited onto the particles 301 prior to electrode assembling by a suitable mechanism. In other designs, the shell 306 may be deposited onto the particles 301 after the electrode assembling by a suitable mechanism (e.g., from a vapor phase by using a suitable vapor deposition technique, such as ALD, CVD, etc. or from a liquid phase). In some designs, a portion of the shell 306 may be deposited before electrode assembling and another portion after the electrode assembling. In this illustrative example, electrolyte 303 does not penetrate into the majority of small pores 305 and does not have a direct contact with the majority of active material volume. In some designs (e.g., when active material belong to a so-called conversion or alloying or metal type active materials for Li metal, Li-ion, Na metal, Na-ion and other types of batteries), it may be preferable for the electrolyte 303 to have a direct contact with about 0-10 vol. % of active material nanoparticles. In some designs, the electrolyte 303 may comprise liquid organic, polymeric (solid polymer or gel type), solid inorganic, liquid inorganic or hybrid (or composite/mixed type) electrolyte.

Figure 4:
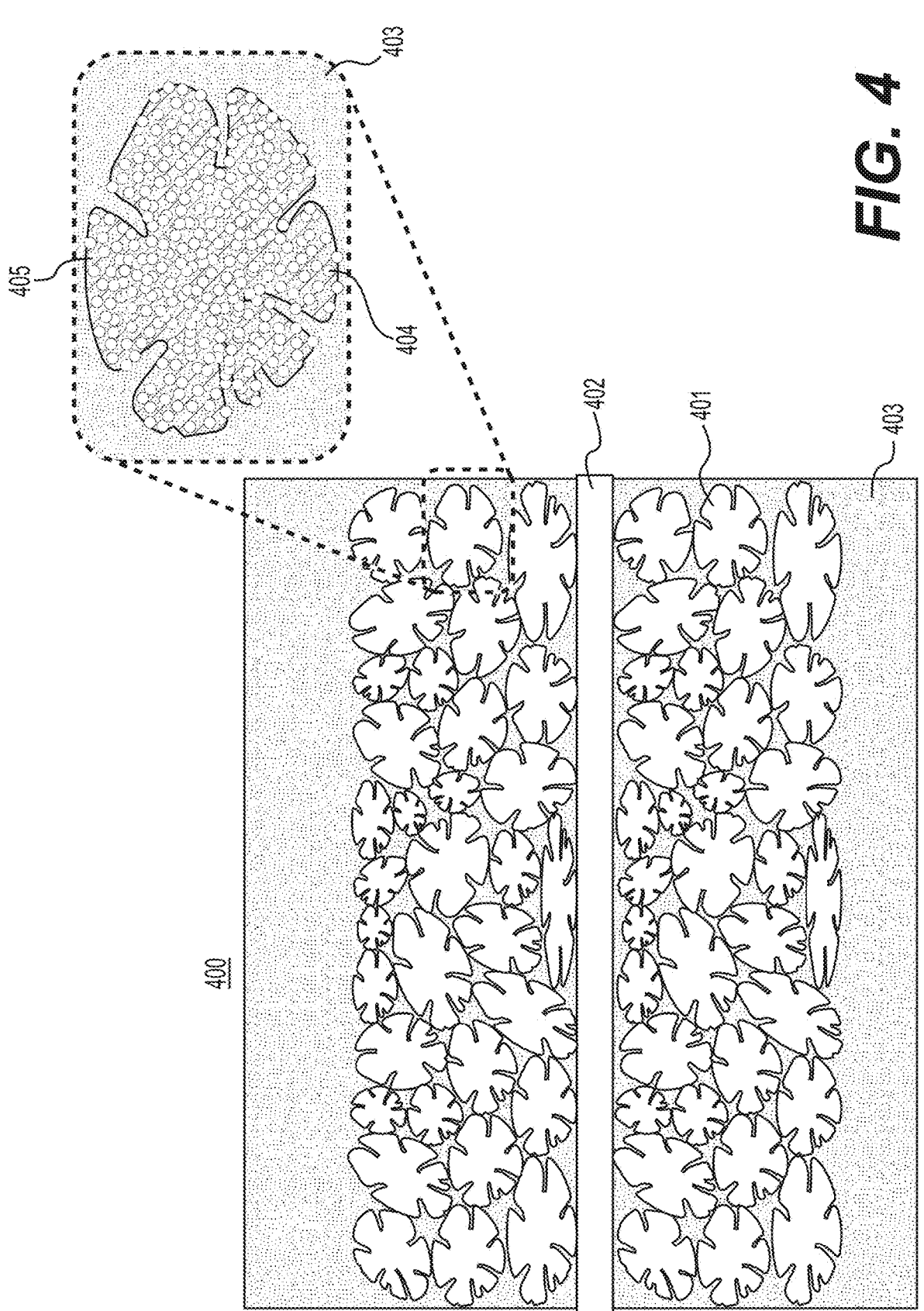
FIG. 4 illustrates another example of an electrode produced with biomass-derived carbon-containing composite particles deposited onto a current collector and filled with an electrolyte according to various example embodiments.

FIG. 4 illustrates another example of an electrode 400 produced with biomass-derived carbon-containing composite particles 401 deposited onto a current collector 402 and filled with an electrolyte 403. In this example biomass-derived carbon-containing composite particles 401 comprise small (e.g., less than about 20 nm) pores 405 at least partially (e.g., by about 30-100%) filled with active material 404 (e.g., in the form of nanoparticles). In this illustrative example electrolyte 403 may penetrate into the majority (e.g., abut 50-100%) of the remaining pores 405 in order to have a direct contact with the majority of active material volume. In some designs (e.g., when active material belongs to a so-called intercalation-type or pseudocapacitive-type or mixed-type active material), it may be preferable for the electrolyte 403 to have a direct contact with about 50-100 vol. % of active material nanoparticles. In some designs, the electrolyte 403 may be aqueous, liquid organic, polymeric (solid polymer or gel type), liquid inorganic or hybrid (or composite/mixed type) electrolyte.

Figure 5:
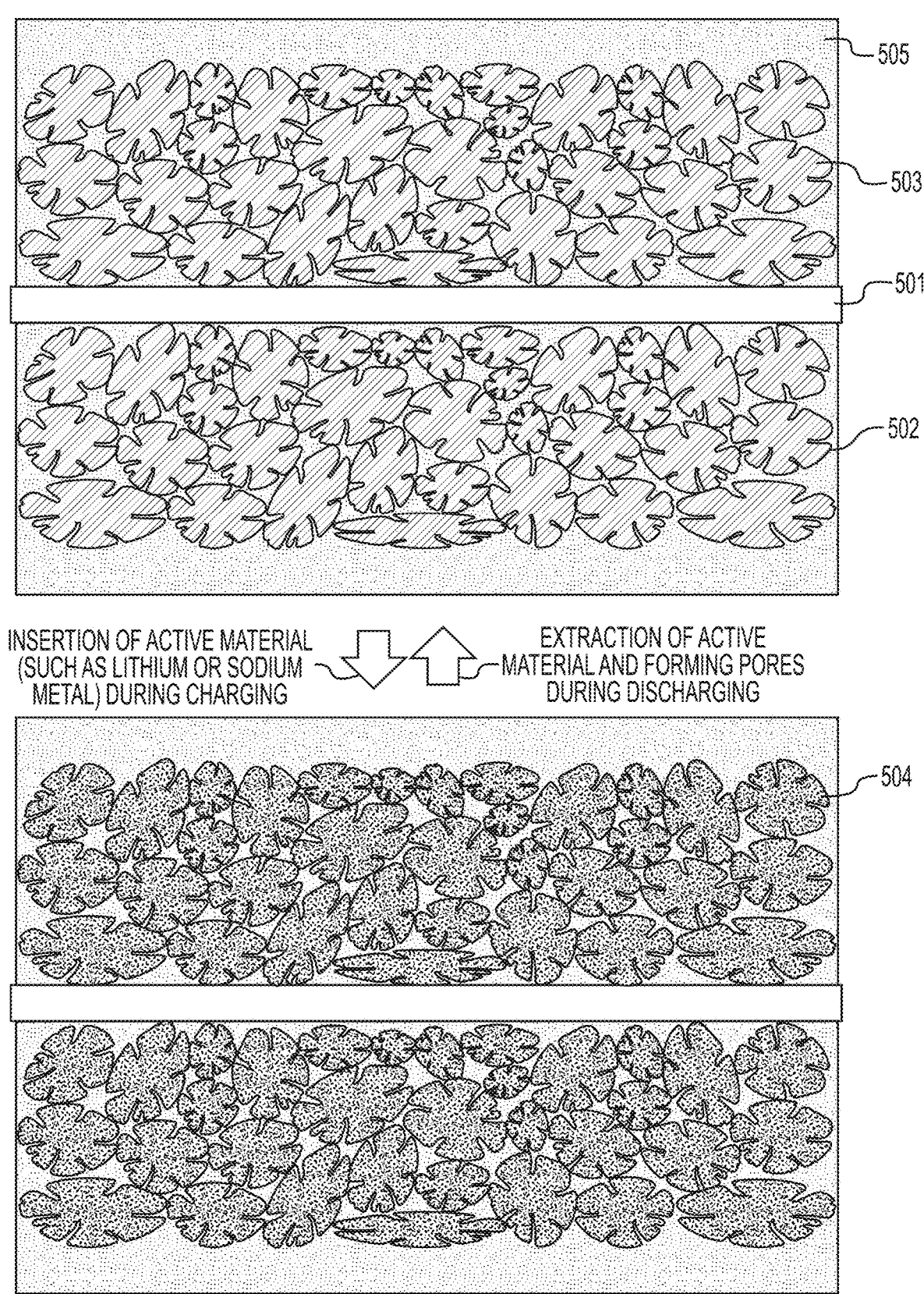
FIG. 5 illustrates an example of an embodiment where active material (e.g., Li or Na metal or another metal in case of metal batteries) is infiltrated into (at least partially empty) pores of biomass-derived (or, in some designs, other types) porous carbon-containing particles of the electrode (e.g., an anode) casted on a current collector during charging of a cell according to various example embodiments.

FIG. 5 illustrates an example of an embodiment where active material 504 (e.g., Li or Na metal or another metal in case of metal batteries) is infiltrated into (at least partially empty) pores 502 of the biomass-derived (or, in some designs, other types) porous carbon-containing particles 503 of the electrode (e.g., an anode) casted on a current collector 501 during charging of the cell. In this illustrative example such an electrode may be assembled free from active material, in some designs. During discharging, a significant portion (e.g., about 50-100%, preferably about 70-100%) of the active material (e.g., Li or Na metal) leaves the pores of the porous particles. At least some portion of the pores (e.g., about 50-100 vol. %) of the biomass-derived carbon-containing particles 503 may preferably remain inaccessible to electrolyte 505 during cell assembling and thus provide space for metal (e.g., Li or Na, etc.) deposition. In some designs, it may be preferable (e.g., for preventing metal deposition on the outer surface of the particles and inducing side reactions or damages to electrolyte) for the electrolyte 505 to be solid (e.g., a solid polymer electrolyte or polymer-ceramic composite electrolyte or inorganic solid electrolyte, etc.) and sufficiently rigid to make it energetically preferable for the metal to be deposited inside the pores to minimize strain energy. In some designs, porous carbon-containing particles 503 may be produced not necessarily from biomass, but from other carbon sources (e.g., including inorganic or hydrocarbon gases or synthetic or natural polymers, among others) and may contain one or more closed pores. In some designs, these pores may be in the range from around 0.3 nm to around 800 nm (that is larger than for many other embodiments).

Figure 6:
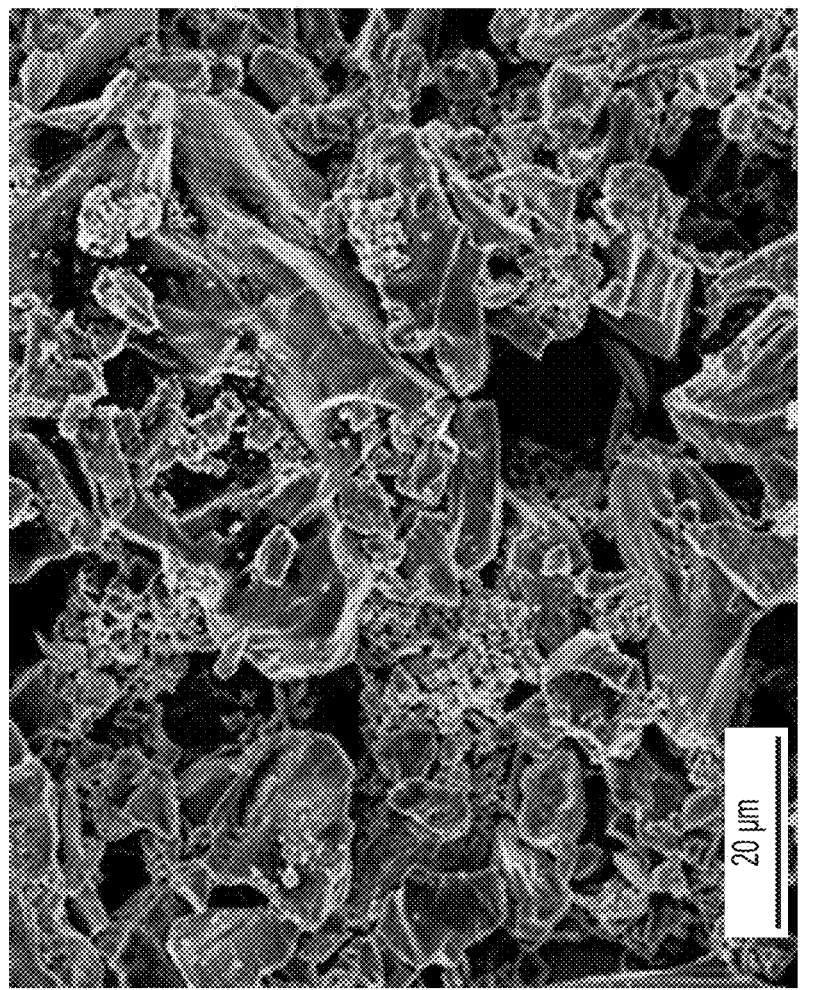
FIG. 6 illustrates an example of suitable porous biomass-derived carbon powder of random shape, which may be utilized in some example embodiments of this disclosure.

FIG. 6 illustrates an example of suitable porous biomass-derived carbon powder of random shape, which may be utilized in some example embodiments of this disclosure. In this example SEM images are taken on activated carbon derived from waste wood product. The particle size distribution is rather broad—e.g., some particles are below about 0.5 micron and some particles are larger than about 20 microns (e.g., up to around 70 microns in linear dimensions). However, an average particle size in FIG. 6 is around 10 microns.

FIG. 7 illustrates an example process that may be utilized for the formation of suitable composites comprising active material and biomass-derived carbon according to various example embodiments. According to this example, a suitable biomass is first provided as a source of carbon (block 701). The biomass is then carbonized (e.g., by a heat-treatment or hydrothermal treatment or both or by other mechanism) to produce biomass-derived carbon (block 702). The produced carbon is then purified to attain a sufficiently low level of impurities (low ash content) (block 703). The produced carbon is then milled to attain a suitable particle size (e.g., with an average size in the range from around 0.3 micron to around 30 micron) (block 704). The milled carbon may then be activated (e.g., by physical or chemical activation) to attain a suitable specific surface area (e.g., from around 400-600 $m^2$/g to around 2,000-5,000 $m^2$/g) and pore volume (e.g., from around 0.2-0.4 $cm^3$/g to around 4-6 $cm^3$/g) (block 705). The produced carbon with suitable porosity is then infiltrated with active material particles by suitable mechanism (e.g., from gaseous environment, such as by chemical vapor deposition, chemical vapor infiltration, atomic layer deposition and/or other mechanism or by using solution or melt-infiltration; the sub-processes involved in suitable active material formation/infiltration may comprise heating in inert or reactive gaseous or liquid environment, hydrothermal treatment, solvothermal treatment and their combinations, among others) (block 706). The active material (e.g., in the form of nanoparticles) may then be (optionally) coated with a protective surface layer of suitable thickness (e.g., about 0.25-50 nm) (block 707). The final stage may (optionally) involve formation of a shell around the composite particles (e.g., in order to seal the pores and active material) (block 708). FIG. 8 illustrates an example method that may be utilized for the formation of suitable composites comprising active material and biomass-derived carbon according to various example embodiments. According to this example, a suitable biomass-derived carbon with suitable size, porosity and purity is first provided (block 801). The produced carbon with suitable porosity is then infiltrated with active material precursor by suitable mechanism (e.g., by using a solution-infiltration, vapor infiltration, chemical-vapor deposition, melt-infiltration, etc.) (block 802). The produced composite is then treated in a first suitable (reactive or inert) gaseous or liquid environment (block 803) and then (in some designs, optionally) the second suitable (reactive or inert) gaseous or liquid environment (block 804) to attain a suitable composition of active material. The first treatment (block 803) may induce decomposition of the precursor material or oxidation/conversion of the precursor material. The second treatment (block 804) may induce further conversion or crystallization of the particles to attain the desired composition of active material. Thus produced composite may then be (optionally) heat-treated (e.g., to increase size of active material particles or to induce crystallization of active material or to remove undesirable synthesis bi-products or contaminants, etc.) (block 805). The active material (e.g., in the form of nanoparticles) may then be (optionally) coated with a protective surface layer of suitable thickness (e.g., about 0.25-50 nm) (block 806) and the composite particles may (optionally) be enclosed in a shell of suitable properties (e.g., in order to seal the pores and active material) (block 807).

Figure 9:
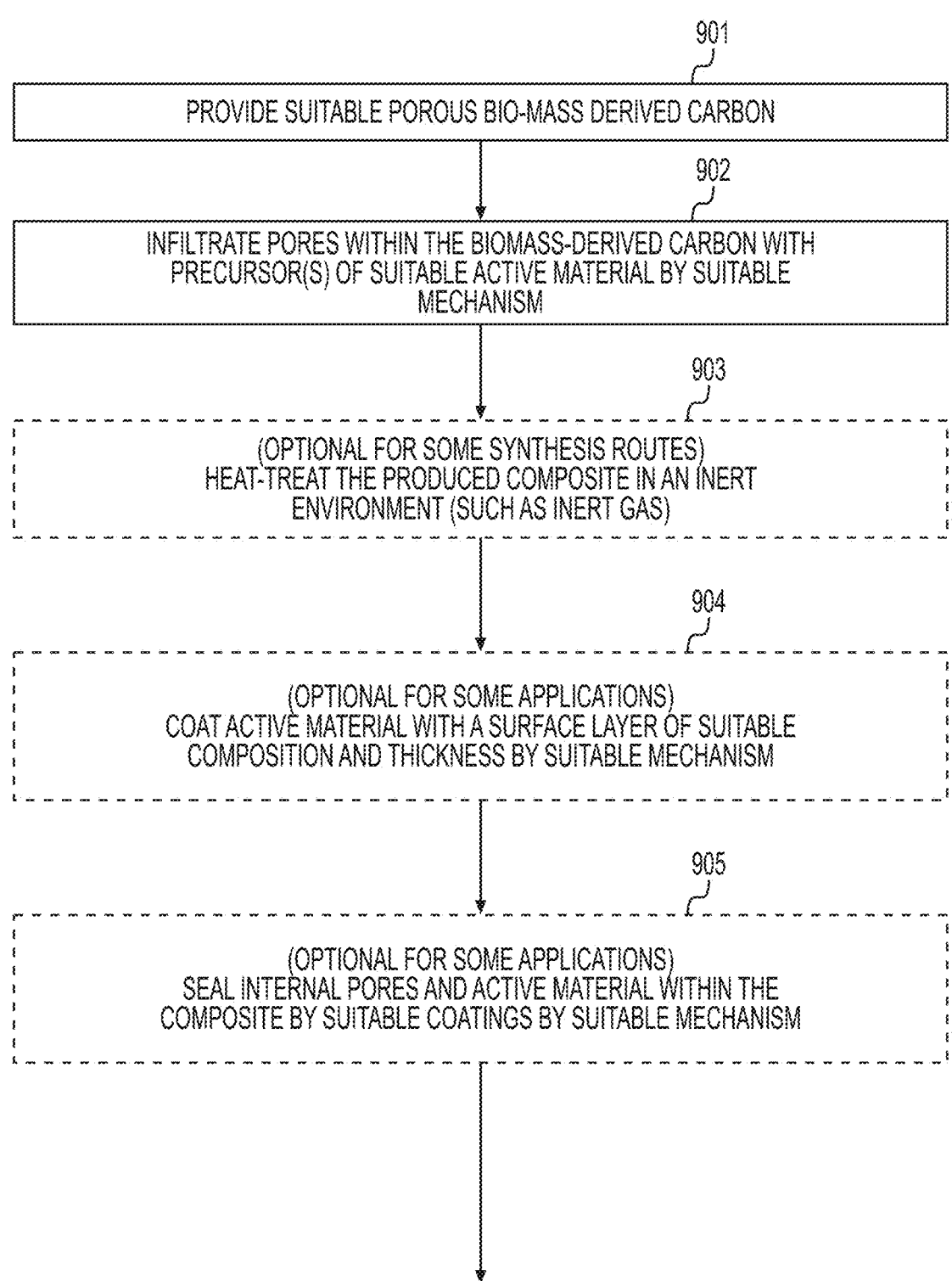
FIG. 9 illustrates yet another example method that may be utilized for the formation of suitable composites comprising active material and biomass-derived carbon according to various example embodiments.

FIG. 9 illustrates yet another example method that may be utilized for the formation of suitable composites comprising active material and biomass-derived carbon according to various example embodiments. According to this example, a suitable biomass-derived carbon with suitable size, porosity and purity is first provided (block 901). The produced carbon with suitable porosity is then infiltrated with active material precursor by suitable mechanism (e.g., by using a solution-infiltration, vapor infiltration, chemical-vapor deposition, melt-infiltration, etc.) (block 902). Thus produced composite may then be (optionally) heat-treated (e.g., to increase size of active material particles or to induce crystallization of active material or to remove undesirable synthesis bi-products or contaminants, etc.) (block 903). The active material or carbon may then be (optionally) coated with a protective surface layer of suitable thickness (e.g., about 0.25-50 nm) (block 904) and the composite particles may (optionally) be enclosed in a shell of suitable properties (e.g., in order to seal the pores and active material) (block 905).

Figure 10:
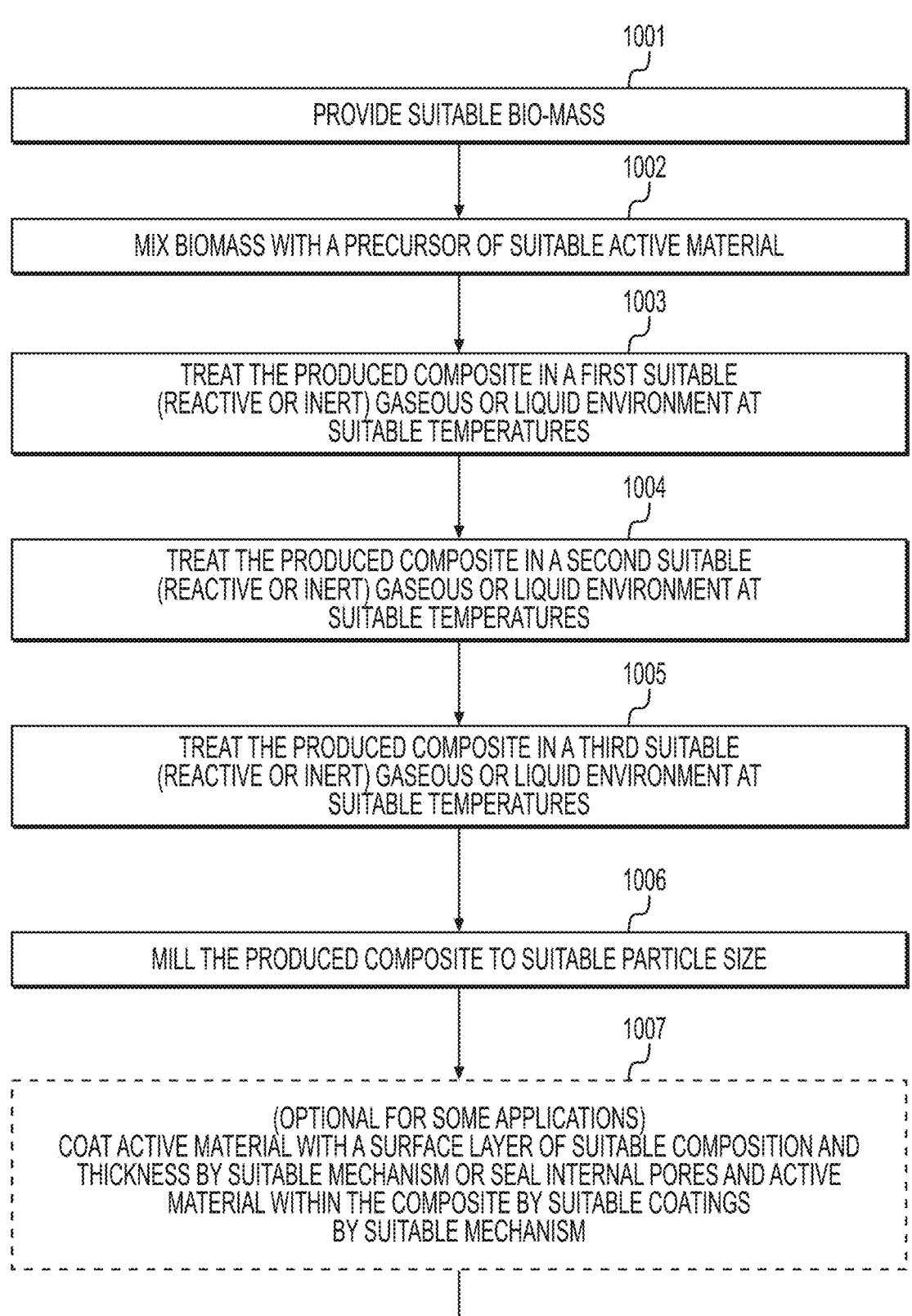
FIG. 10 illustrates yet another example method that may be utilized for the formation of suitable composites comprising active material and biomass-derived carbon according to various example embodiments.

FIG. 10 illustrates yet another example method that may be utilized for the formation of suitable composites comprising active material and biomass-derived carbon according to various example embodiments. According to this example, a suitable biomass (or biomass-derived carbon-containing natural polymer or another biomass-derived carbon-containing natural substance) is first provided (block 1001) and then finely mixed with a suitable active material precursor (block 1002). The mixing stage may involve either a dry mixing (or milling) at room or elevated temperatures (e.g., from around room temperature to around 400° C.) or a solution mixing (or milling) or both and may aim to attain a uniform composite comprising fine (sub-200 nm) particles of the precursor material in a matrix of biomass (or a biomass-derived carbon-containing product). The mixture is then heat-treated in the first controlled environment (e.g., in reactive or inert gaseous environment or liquid environment, such a hydrothermal or solvothermal) (block 1003) then in the second controlled environment (e.g., in reactive or inert gaseous environment or liquid environment, such a hydrothermal or solvothermal) (block 1004) and then in the third controlled environment (e.g., in reactive or inert gaseous environment or liquid environment, such a hydrothermal or solvothermal) (block 1005) to attain the desired morphology and composition of the active material and biomass-derived carbon. The produced composite may be milled to a desired particle size distribution (block 1006). Note that in some designs, the milling stage may be conducted earlier (e.g., after the first or second treatment stages-after blocks 1004 or 1005). The active material or carbon may then be (optionally) coated with a protective surface layer of suitable thickness (block 1006) and the composite particles may (optionally) be enclosed in a shell of suitable properties (e.g., in order to seal the pores and active material) (block 1007).

The nanocomposite particles may generally be of any shape (e.g., near-spherical, cylindrical, plate-like, have a random shape, etc.) and of any size. The maximum size of the particle may depend on the rate performance requirements, on the rate of the ion diffusion into the partially filled particles, and on other parameters.

In an example, the "size" of a nanocomposite particle may be determined in any of a variety of ways. In one example, the size of an individual particle may refer to the diameter of the particle if the particle is spherical or near-spherical. In another example, the size of an individual particle may refer to the diameter of an equivalent volume sphere (e.g., a representative same-volume sized sphere of the particle) of the particle if the particle is non-spherical (e.g., spheroidal, oblong, etc.). If the equivalent volume sphere approach is used, the total pore volume from the particle is retained in the equivalent volume sphere of the particle. In yet another example, for an irregularly shaped particle (e.g., an oblong particle), the size of an individual particle may refer to a smallest dimension of the particle (e.g., width) or a length of the particle (e.g., length). Hence, the various particle size ranges described with respect to embodiments of the disclosure may refer to sizes determined in accordance with any of the above-noted methodologies, based on the shapes and/or other characteristics of the respective particles.

This description is provided to enable any person skilled in the art to make or use embodiments of the present invention. It will be appreciated, however, that the present invention is not limited to the particular formulations, process stages, and materials disclosed herein, as various modifications to these embodiments will be readily apparent to those skilled in the art. That is, the generic principles defined herein may be applied to other embodiments without departing from the spirit or scope of the invention.

The invention claimed is:

1. A carbon-comprising composite particle for use in Li-ion anodes comprising:
   (i) porous carbon derived from fruit,
   (ii) conversion or alloying-type active material infiltrated into one or more pores of the porous carbon,
   wherein the conversion or alloying-type active material comprises from about 40 wt. % to about 85 wt. % of the carbon-comprising composite particle.

2. The carbon-comprising composite particle of claim 1, wherein the porous carbon comprises from about 90% to about 100% of $sp^2$-bonded carbon atoms.

3. The carbon-comprising composite particle of claim 1, wherein the porous carbon exhibits electrical conductivity in a range from about 1 S/m to about $10^6$ S/m.

4. The carbon-comprising composite particle of claim 1, wherein the carbon-comprising composite particle exhibits an average characteristic dimension in a range from around 300 nm to around 30 microns.

5. The carbon-comprising composite particle of claim 4, wherein the carbon-comprising composite particle exhibits the average characteristics dimension in a range from around 0.5 micron to around 10 microns.

6. The carbon-comprising composite particle of claim 1, wherein, without the conversion or alloying-type active material, the porous carbon exhibits:
   an average Brunauer-Emmett-Teller (BET) specific surface area (SSA) in a range from about 400 $m^2/g$ to about 5,000 $m^2/g$, and
   an open pore volume in a range from around 0.4 $cm^3/g$ to around 6 $cm^3/g$, as determined by $N_2$ sorption measurements.

7. The carbon-comprising composite particle of claim 6, wherein the open pore volume is in a range from around 0.75 cm³/g to around 2.5 cm³/g, as determined by $N_2$ sorption measurements.

8. The carbon-comprising composite particle of claim 1, wherein the porous carbon exhibits a compositional purity of more than about 90 wt. %.

9. The carbon-comprising composite particle of claim 8, wherein the compositional purity is more than about 96 wt. %.

10. The carbon-comprising composite particle of claim 1, wherein the porous carbon comprises less than about 2 wt. % of hydrogen atoms.

11. The carbon-comprising composite particle of claim 1, wherein the porous carbon comprises an ash content of less than about 4 wt. %.

12. The carbon-comprising composite particle of claim 11, wherein the ash content is less than about 1 wt. %.

13. The carbon-comprising composite particle of claim 1, wherein the porous carbon comprises activated carbon.

14. The carbon-comprising composite particle of claim 1, wherein the conversion or alloying-type active material comprises alloying-type active material nanoparticles that comprise a non-carbon group IV element with an atomic number of 14.

15. The carbon-comprising composite particle of claim 14, wherein the alloying-type active material nanoparticles are infiltrated into the one or more pores via a chemical vapor deposition (CVD).

16. The carbon-comprising composite particle of claim 14, wherein an average size of the alloying-type active material nanoparticles ranges from about 2 nm to about 30 nm.

17. The carbon-comprising composite particle of claim 1, wherein the carbon-comprising composite particle comprises pores, wherein about 75 vol. % to about 100 vol. % of the pores remain sealed and are configured to not be directly accessible by an electrolyte once the carbon-comprising composite particle is part of a Li-ion battery cell.

18. The carbon-comprising composite particle of claim 1, wherein the carbon-comprising composite particle comprises pores, wherein from about 30 vol. % to about 100 vol. % of the pores exhibit a characteristic dimension in a range from about 0.4 nm to about 15 nm.

19. The carbon-comprising composite particle of claim 18, wherein from about 30 vol. % to about 100 vol. % of the pores exhibit the characteristic dimensions in the range from about 0.5 nm to about 10 nm.

20. The carbon-comprising composite particle of claim 1, wherein the carbon-comprising composite particle comprises sealed pores, wherein a volume fraction of the sealed pores ranges from about 5% to about 100% of a volume required for volume expansion of the conversion or alloying-type active material upon full lithiation.

21. The carbon-comprising composite particle of claim 1, wherein a Brunauer-Emmett-Teller (BET) specific surface area (SSA) of the carbon-comprising composite particle ranges from about 0.2 m²/g to about 100 m²/g.

22. The carbon-comprising composite particle of claim 1, wherein the carbon-comprising composite particle comprises a protective surface layer with a thickness from about 0.3 nm to about 60 nm.

23. The carbon-comprising composite particle of claim 22, wherein the protective surface layer comprises carbon.

24. The carbon-comprising composite particle of claim 1, wherein the porous carbon is derived from olive pits, cherry stones, peach stones, avocado stones, coconut shells, banana fibers or any combination thereof.

25. The carbon-comprising composite particle of claim 1, wherein the porous carbon is derived from fruit shells of the fruit.

* * * * *